(12) United States Patent
Kawashima et al.

(10) Patent No.: US 8,532,528 B2
(45) Date of Patent: Sep. 10, 2013

(54) IMAGE FORMING APPARATUS HAVING COUPLING FOR DRIVING TRANSFER UNIT

(75) Inventors: Tomomichi Kawashima, Numazu (JP); Takayuki Miyamoto, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/408,194

(22) Filed: Feb. 29, 2012

(65) Prior Publication Data

US 2012/0213548 A1 Aug. 23, 2012

Related U.S. Application Data

(60) Division of application No. 12/754,732, filed on Apr. 6, 2010, now Pat. No. 8,165,499, which is a continuation of application No. PCT/JP2008/070243, filed on Oct. 30, 2008.

(30) Foreign Application Priority Data

Oct. 30, 2007 (JP) .................................. 2007-281830
Oct. 29, 2008 (JP) .................................. 2008-278424

(51) Int. Cl.
*G03G 15/08* (2006.01)
(52) U.S. Cl.
USPC ........................................................ 399/121
(58) Field of Classification Search
USPC ................. 399/107, 110, 111, 116, 117, 121, 399/167
See application file for complete search history.

(56) References Cited

U.S. PATENT DOCUMENTS

| | | | |
|---|---|---|---|
| 6,577,831 B1 * | 6/2003 | Kojima et al. | ................ 399/111 |
| 7,310,489 B2 * | 12/2007 | Kawai | ........................... 399/111 |
| 7,366,445 B2 | 4/2008 | Hoashi et al. | |
| 7,522,860 B2 | 4/2009 | Shiraki | |
| 7,555,249 B2 | 6/2009 | Kawai | |
| 2008/0152388 A1 | 6/2008 | Ueno et al. | |

FOREIGN PATENT DOCUMENTS

| | | |
|---|---|---|
| JP | 2005-157112 A | 6/2005 |
| JP | 2006-276529 A | 10/2006 |
| JP | 2007-079139 A | 3/2007 |
| JP | 2008-233867 A | 10/2008 |

OTHER PUBLICATIONS

Official Notice dated May 30, 2012, in Korean Application No. 9-5-2012-031466289.

(Continued)

*Primary Examiner* — Hoan Tran
(74) *Attorney, Agent, or Firm* — Fitzpatrick, Cella, Harper & Scinto

(57) ABSTRACT

An image forming apparatus includes a main assembly and a transfer unit. A rotatable first coupling is provided in the main assembly and is rotatable by a driving source. The transfer unit is detachably mountable to the main assembly and is movable in a first direction when dismounted from the main assembly. The transfer unit includes a movable belt and a rotatable second coupling capable of receiving a driving force from the first coupling. The first direction is parallel with a traveling direction of the belt. One of the first and second couplings is movable in a second direction perpendicular to the first direction. When the transfer unit is dismounted from the main assembly, one of the first and second couplings is moved in the second direction to retract from the other coupling, by the transfer unit being moved in the first direction with the first and second couplings being kept in contact with each other.

11 Claims, 26 Drawing Sheets

(56) References Cited

OTHER PUBLICATIONS

International Search Report issued Nov. 20, 2008, in PCT JP2008/070243.

Notice of Allowance mailed Nov. 20, 2012, in Korean Application No. 10-2010-7008830.

* cited by examiner (a)

(b)

IMAGE FORMING APPARATUS HAVING COUPLING FOR DRIVING TRANSFER UNIT

CROSS REFERENCE TO RELATED APPLICATIONS

This application is a division of U.S. patent application Ser. No. 12/754,732, filed Apr. 6, 2010, now U.S. Pat. No. 8,165,499, which is a continuation of Application No. PCT/JP2008/070243, filed Oct. 30, 2008. The entire disclosure of the earlier applications is hereby incorporated by reference herein.

TECHNICAL FIELD

The present invention relates to an image forming apparatus provided with a drive transmission device for transmitting a driving force to a unit detachably mountable to an apparatus main assembly.

BACKGROUND ART

In recent years, in an image forming apparatus such as a printer, a copying machine, or the like, of an electrophotographic type, downsizing and improvement in operativity have been desired.

From the viewpoint of the improvement in operativity of the image forming apparatus, a process cartridge system in which a photosensitive member, a charging means, a developing means, a cleaning means, and the like are integrally assembled into a cartridge and the cartridge is detachably mountable to an image forming apparatus main assembly has been employed. By this cartridge system, the operativity was further improved, so that it became possible to easily perform maintenance of the above-described process means such as the developing means by a user himself (herself).

Similarly, an intermediary transfer member and the like of the image forming apparatus main assembly is also constituted as a unit and the unit is detachably mountable to the image forming apparatus main assembly to improve the operativity and a maintenance property.

Further, as the drive transmission device for stably transmitting a driving force to these units detachably mountable to the image forming apparatus main assembly with reliability, coupling performed by a combination of a projected portion XX and a corresponding recessed portion YY as shown in FIG. 26 has been used.

In Japanese Laid-Open Patent Application (Tokkai) 2005-157112, a constitution in which a coupling pair is interrelated with an openable cover or the like and by an opening operation of the cover, an apparatus main assembly-side coupling is retracted from a unit-side coupling to disengage the coupling pair thereby to permit mounting and demounting of the unit is disclosed.

DISCLOSURE OF THE INVENTION

However, in order to disengage and engage the couplings in interrelation with an opening and closing operation of the cover, in addition to an opening and closing mechanism portion of the cover, there is need to provide a mechanism for disengaging and engaging the couplings. By this mechanism, an opening and closing operativity of the cover has been deteriorated and a resultant constitution has been complicated to invite an increase in cost.

For example, in the case where a link mechanism is provided on the cover in order to engage and disengage the couplings, disengagement and engagement of the couplings are performed every opening and closing load of the disengagement and engagement of the couplings is borne by the cover. The load such as a resistance required for disengaging and engaging the couplings is apt to be added to an operating force for opening and closing the cover. Particularly, in a color image forming apparatus in which four process cartridges are arranged, the load for disengaging and engaging the couplings becomes large and for that reason, the operativity for opening and closing the cover has been deteriorated.

Further, the link mechanism is required to have high rigidity. In addition, there are needs to increase a size of the link mechanism itself and to increase the rigidity of the cover, thus leading to increases in size and cost of the apparatus.

In order to solve the above-described problems, according to an aspect of the present invention, there is provided an image forming apparatus comprising:

an apparatus main assembly;

a unit detachably mountable to the apparatus main assembly;

a first coupling, provided on the apparatus main assembly, for being rotated by power from a driving source; and a second coupling, provided on the unit, for being rotated by engaging with the first coupling, wherein either one of the first coupling and the second coupling has a recessed shape and the other coupling has a projected shape, at least one of an outer peripheral portion of the projected-shape coupling and an inner peripheral surface of the recessed-shape coupling having an inclined surface, wherein at least one of the first coupling and the second coupling is retractable toward a direction parallel to a rotation shaft thereof, and wherein the image forming apparatus has a structure such that a rotation shaft of the second coupling is more movable than a rotation shaft of the first coupling in a disengaging direction of the unit by a force exerted in the disengaging direction of the unit when the unit is pulled out from the apparatus main assembly in a direction perpendicular to the rotation shaft of the first cartridge and then by movement of the rotation shaft, at least one of the first cartridge and the second cartridge is retracted along the inclined surface in the direction parallel to the rotation shaft.

These and other objects, features and advantages of the present invention will become more apparent upon a consideration of the following description of the preferred embodiments of the present invention taken in conjunction with the accompanying drawings.

BEST MODE FOR CARRYING OUT THE INVENTION

Embodiment 1

This embodiment will be described by using a four-drum type color image forming apparatus of an electrophotographic type as an apparatus main assembly and using an intermediary transfer unit as a detachably mountable unit. Further, in this embodiment, in order to transmit from the apparatus main assembly a driving force for moving a primary transfer roller in the intermediary transfer unit away from a corresponding photosensitive drum, a drive transmission device is used. The drive transmission device in this embodiment includes a first coupling and a second coupling rotating by being engaged with the first coupling.

Hereinbelow, an embodiment of the present invention will be described in the order of the image forming apparatus, the intermediary transfer unit, and the drive transmission device with reference to FIGS. 1 to 12.

[Image Forming Apparatus]

First, a constitution of an apparatus main assembly 100 will be described.

Figure 1:
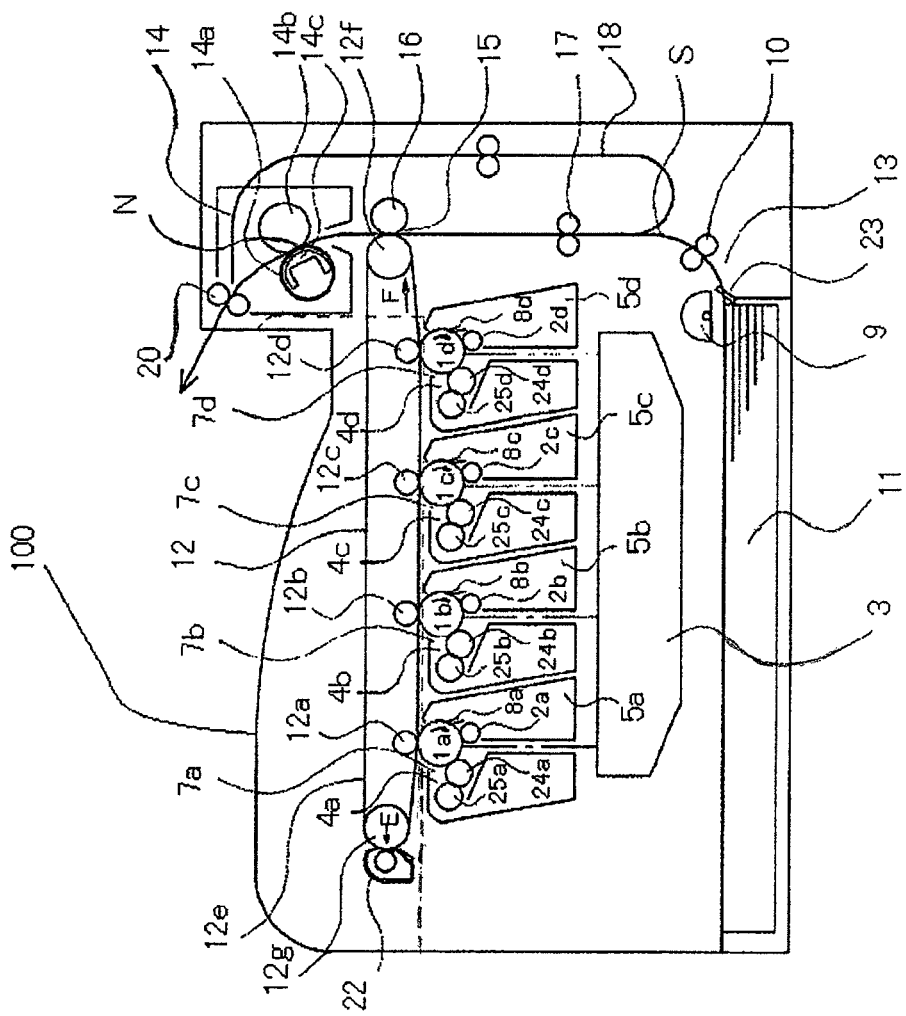
FIG. 1 is a sectional view showing a major part of an image forming apparatus according to Embodiment 1 of the present invention.

FIG. 1 is a sectional view showing an embodiment of the image forming apparatus according to the present invention.

(1) Toner Image Forming Process

Formation of the toner image is performed by a photosensitive drum 1 as a photosensitive member, a charging roller 2 as a charging unit, an exposure unit 3, a developing unit 4, and the like. The apparatus main assembly 100 includes four photosensitive drums 1a, 1b, 1c and 1d. Around each of the respective photosensitive drums 1, along its rotational direction, the charging roller 2 (2a, 2b, 2c, 2d) for electrically charging the surface of the photosensitive drum 1 uniformly and the exposure unit 3 for irradiating the photosensitive drum 1 surface with laser light on the basis of image information to form an electrostatic latent image on the photosensitive drum 1 are disposed in this order. Further, the developing unit 4 (4a, 4b, 4c, 4d) for developing (visualizing) the electrostatic latent image as a toner image by depositing toner on the electrostatic latent image on the photosensitive drum 1, and a transfer means 12a, 12b, 12c or 12d for transferring the toner image from the photosensitive drum 1 onto an intermediary transfer belt 12e are disposed. Further, a cleaning means 8 (8a, 8b, 8c, 8d) for removing transfer residual toner remaining on the photosensitive drum 1 surface after the transfer is disposed.

The photosensitive drum 1, the charging roller 2, the developing unit 4, and the cleaning means 8 (8a, 8b, 8c, 8d) are integrally assembled into a cartridge to prepare a process cartridge 7 (7a, 7b, 7c, 7d). Each of the thus-prepared process cartridges is configured to be detachably mountable to the apparatus main assembly 100. These four process cartridges 7a, 7b, 7c and 7d have the same structure but are different in that they form different color images by using a yellow (Y) toner, a magenta (M) toner, a cyan (C) toner, and a black (Bk) toner, respectively.

The process cartridges 7a, 7b, 7c and 7d are constituted by the developing units 4a, 4b, 4c and 4d are cleaning units 5a, 5b, 5c and 5d. Of these units, the former developing units 4a, 4b, 4c and 4d include developing rollers 24a, 24b, 24c and 24d, developer application rollers 25a, 25b, 25c and 25d, and toner containers. The latter cleaning units 5a, 5b, 5c and 5d includes the photosensitive drums 1a, 1b, 1c and 1d, the charging rollers 2a, 2b, 2c and 2d, the cleaning means 8a, 8b, 8c and 8d, and transfer residual toner containers.

The photosensitive drums 1a, 1b, 1c and 1d are constituted by applying an organic photoconductor (OPC) layer onto an outer peripheral surface of an aluminum cylinder and are rotatably supported by flanges at their both end portions. By transmitting a driving force from a driving motor (not shown) to one end portion of each of the portions 1a, 1b, 1c and 1d, each photosensitive drum is rotationally driven in a clockwise direction indicated by an arrow in FIG. 1.

The charging rollers 2a, 2b, 2c and 2c are an electroconductive roller formed in a roller shape. These charging rollers are brought into contact with the photosensitive drums 1a, 1b, 1c and 1d are a charging voltage is applied to the charging rollers by a power source circuit (not shown), so that the surfaces of the photosensitive drums 1a, 1b, 1c and 1d are electrically charged uniformly. The exposure unit 3 is disposed vertically below the process cartridges 7 (7a, 7b, 7c, 7d) and exposes the photosensitive drums 1a, 1b, 1c and 1d to light on the basis of an image signal.

In the toner containers, the color toners of yellow (Y), magenta (M), cyan (C) and black (Bk) are accommodated, respectively.

The developing rollers 24a, 24b, 24c and 24d are disposed adjacent to the surfaces of the photosensitive drums 1a, 1b, 1c and 1d, respectively. These developing rollers are rotationally driven by a driving portion (not shown) and are supplied with a voltage, thus effecting development of the electrostatic latent images into toner images on the surfaces of the photosensitive drums 1a, 1b, 1c and 1d.

By the constitution described above, the toner images of Y, M, C and Bk are formed on the surfaces of the photosensitive drums 1a, 1b, 1c and 1d. The toner images formed on the surfaces of the photosensitive drums 1a, 1b, 1c and 1d are successively primary-transferred onto the surface of the intermediary transfer belt 12e. Thereafter, toners remaining on the surfaces of the photosensitive drums 1a, 1b, 1c and 1d are removed by the cleaning means 8a, 8b, 8c and 8d to be collected in the transfer residual toner container in the cleaning units 5a, 5b, 5c and 5d.

(2) Transfer onto Transfer Material and Fixing Process

Transfer of the toner images onto a transfer material S is performed at a secondary transfer portion 15 to which the transfer material S has been fed by a sheet feeding device 13. The intermediary transfer unit 12 carries the toner images formed by the primary transfer process and conveys the toner images to the secondary transfer portion 15. A fixing device 14 is located on a downstream side of the secondary transfer portion 15 and fixes the toner images, transferred on the transfer material S, on the transfer material S.

The sheet feeding device 13 is principally constituted by a sheet feeding cassette 11, a sheet feeding roller 9, a separating means 23, and a registration roller pair 10 for nip-conveying the transfer material S. The fixing device 14 is constituted by a fixing film 14a, a pressing roller 14b, a heating element 14c, and a sheet discharging roller pair 20.

The sheet feeding cassette 11 can be pulled out in a frontward direction of the apparatus main assembly 100 (a leftward direction of the apparatus main assembly 100 in FIG. 1). A user pulls out the sheet feeding cassette 11 from the apparatus main assembly 100 and then sets the transfer material S in the sheet feeding cassette 11 and inserts the sheet feeding cassette 11 into the apparatus main assembly 100, so that supply of the transfer material S can be effected. The sheet feeding roller 9 press contacts the transfer material S accommodated in the sheet feeding cassette 11 and feeds the transfer material S by its rotation with predetermined timing, so that the transfer material S is separated and fed one by one by the separating means 23. Thereafter, the transfer material S is conveyed to the secondary transfer portion 15 by the registration roller pair 10.

At the secondary transfer portion 15, a bias is applied to a secondary transfer means 16, so that the toner images on the intermediary transfer belt 12e are transferred onto the transfer material S which has been conveyed to the secondary transfer portion 15.

The fixing film 14a is an endless cylindrical belt and an outer peripheral surface thereof is disposed on a toner image surface side of the transfer material S. The heating element 14c is disposed inside the fixing film 14a and the pressing roller 14b opposes the heating element 14c through the fixing film 14a while press-contacting the fixing film 14a. The pressing roller 14b is rotationally driven by a driving means (not shown) to rotate the fixing film 14a correspondingly, so that the fixing film 14a is heated by the heating element 14c. The transfer material S conveyed from the secondary transfer portion 15 is nip-conveyed between the fixing film 14a and the pressing roller 14b, so that the toner images are heat-fixed on the transfer material S. The transfer material S on which the toner images are fixed is then nip-conveyed by the sheet discharging roller pair 20 and is discharged on a sheet discharge tray.

[Intermediary Transfer Unit]

Figure 2:
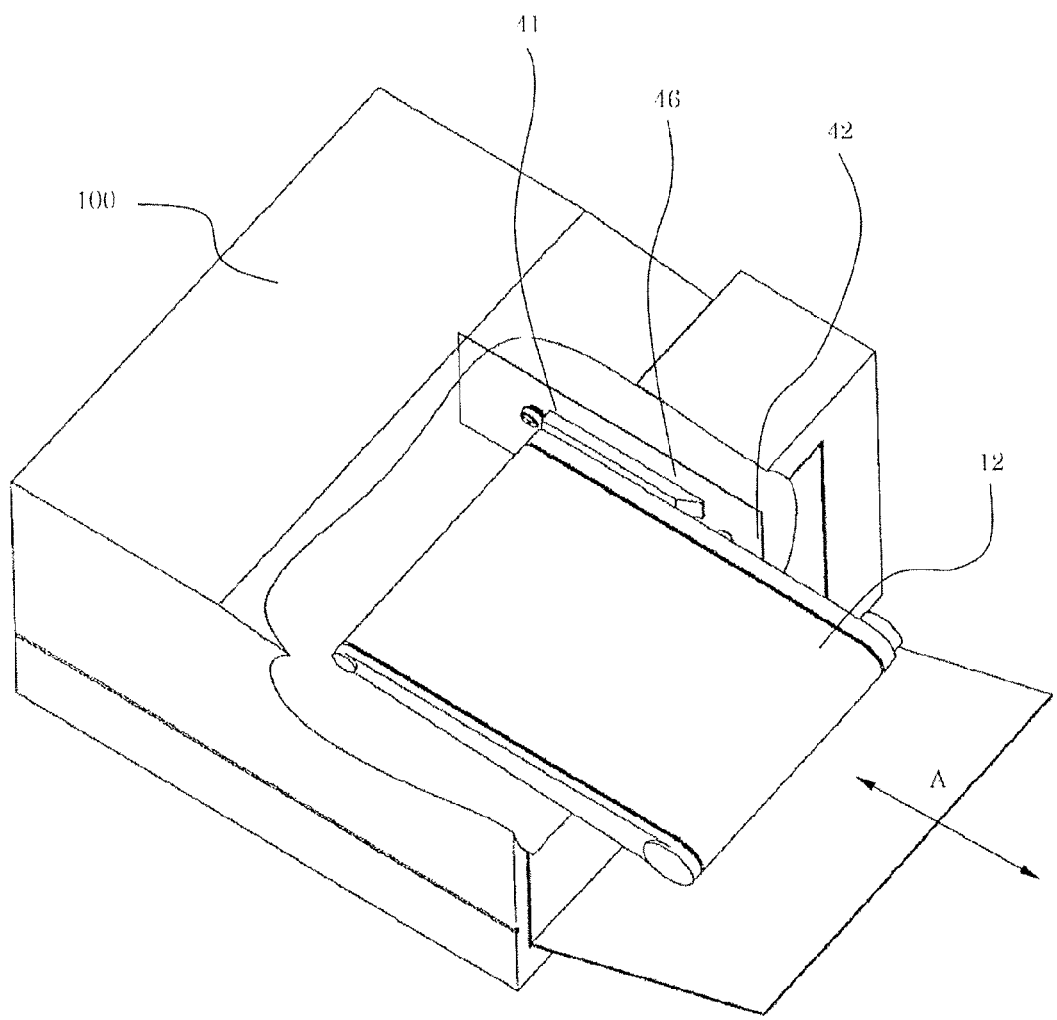
FIG. 2 is a perspective view showing a mounting and demounting direction of a unit according to Embodiment 1 of the present invention.

In this embodiment, the intermediary transfer unit 12 is detachably mountable to the apparatus main assembly 100. As shown in FIG. 2, the intermediary transfer unit 12 is configured to be detachably mountable to the apparatus main assembly 100 with respect to a direction A indicated by a double-pointed arrow.

The intermediary transfer unit 12 is principally constituted by the intermediary transfer belt (intermediary transfer member) 12e, a driving roller 12f, a follower roller 12g, the primary transfer rollers 12a, 12b, 12c and 12d, a cleaning means 22, and a primary transfer (member) spacing means 30. The intermediary transfer belt 12e is stretched around the driving roller 12f and the follower roller 12g. The follower roller 12g is urged in a direction E indicated by an arrow in FIG. 1 by an urging means to apply a predetermined tension to the intermediary transfer belt 12e.

The driving roller 12f is rotationally driven by a motor (not shown) or the like, so that the intermediary transfer belt 12e is rotated at a predetermined speed in a direction F indicated by an arrow in FIG. 1.

Each of the primary transfer rollers 12a, 12b, 12c and 12d is disposed inside the intermediary transfer belt 12e so as to oppose an associated one of the photosensitive drums 1a, 1b, 1c and 1d and is urged toward the photosensitive drum 1 by an urging member 31. By applying a voltage to the primary transfer rollers 12a, 12b, 12c and 12d, the toner images formed on the respective photosensitive drums 1a, 1b, 1c and 1d are primary-transferred onto the intermediary transfer belt 12e. On the intermediary transfer belt 12e, the four color toner images are superposedly transferred and then are conveyed to the secondary transfer portion 15.

After the secondary transfer, the toner remaining on the intermediary transfer belt 12e is removed by the cleaning means 22 and is collected, by way of a transfer residual toner conveying path (not shown), in a toner collecting container (not shown) disposed in the apparatus main assembly 100.

The intermediary transfer unit 12 has a spacing constitution for the primary transfer rollers, corresponding to Y, M and C, which oppose the associated ones of the photosensitive drums 1 while contacting the intermediary transfer belt 12e during color image formation. This spacing constitution is employed for suppressing sliding on the photosensitive drums 1 which are not used during monochromatic image formation and for prolonging the lifetime of the photosensitive drums 1.

Figure 9:
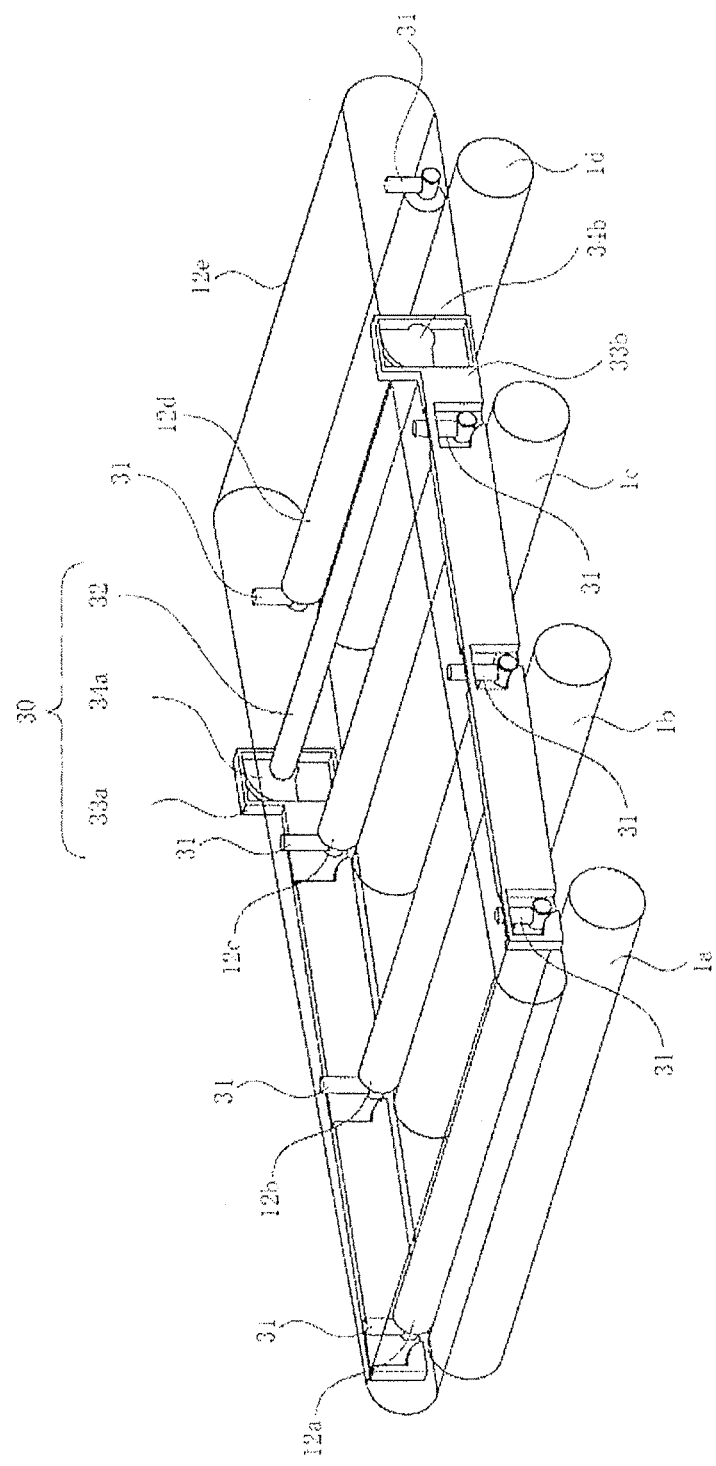
FIG. 9 is a schematic perspective view showing a primary transfer (member) spacing means according to Embodiment 1 of the present invention (phase G).
Figure 10:
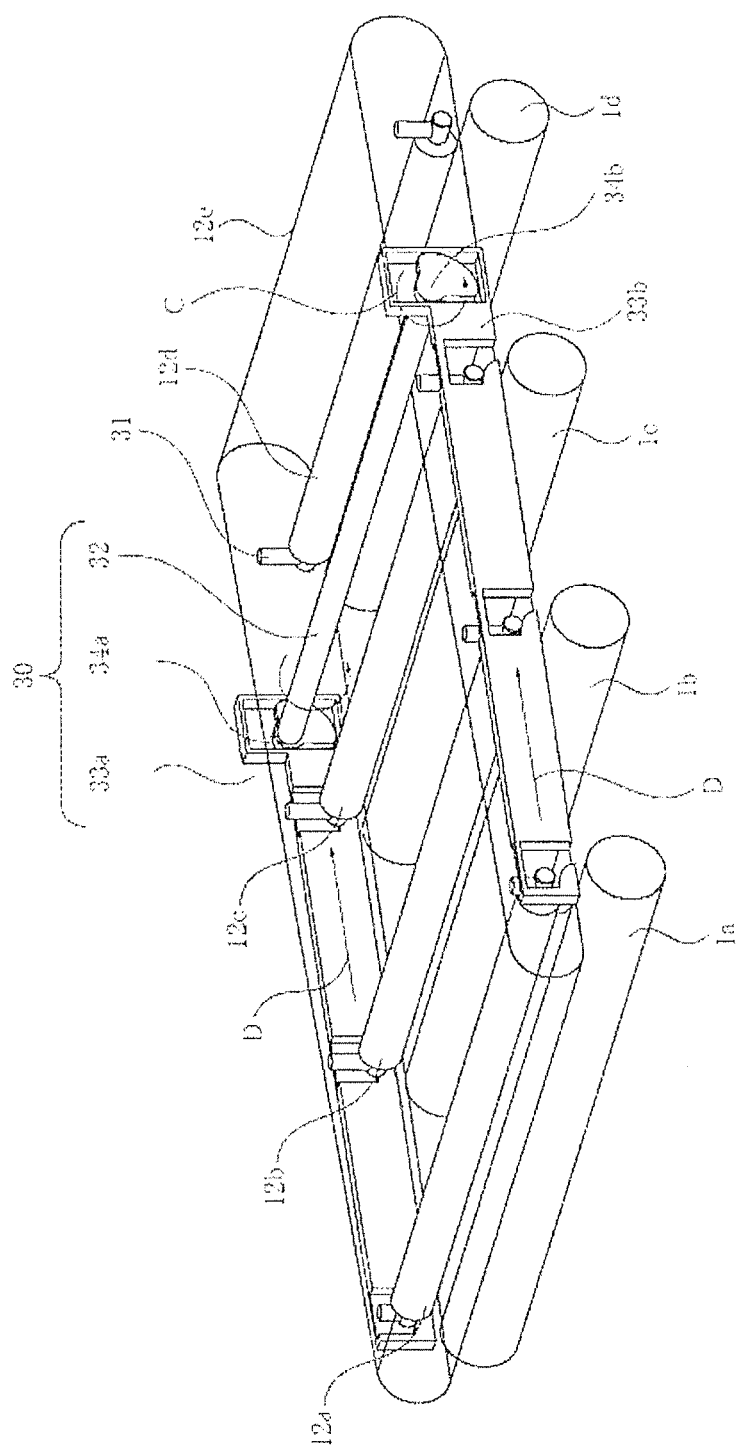
FIG. 10 is a schematic perspective view showing the primary transfer spacing means according to Embodiment 1 of the present invention (phase H).
Figure 11:
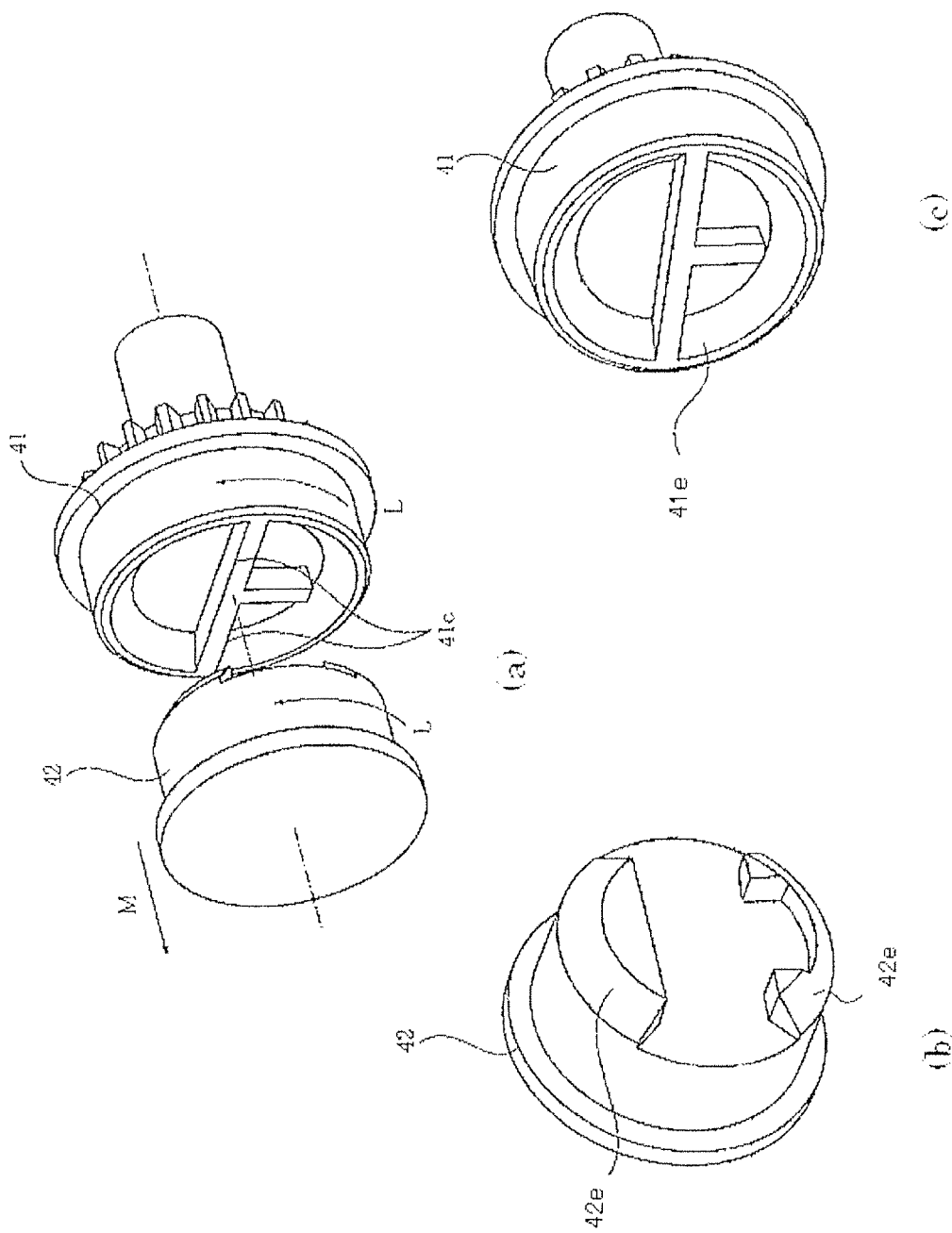
FIGS. 11(a) to 11(c) are perspective views showing other couplings according to Embodiment 1 of the present invention.
Figure 12:
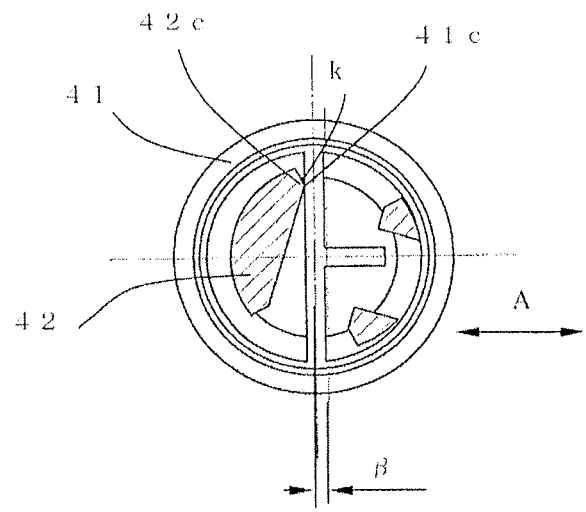
FIGS. 12(a) and 12(b) are plan views showing other phases of the couplings according to Embodiment 1 of the present invention.
Figure 12:
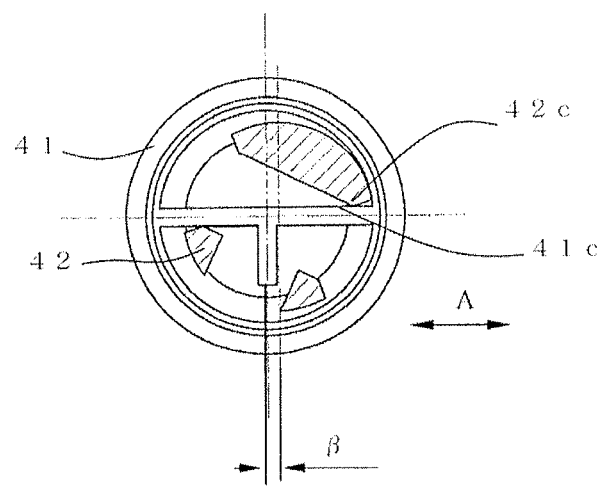

FIGS. 9 and 10 shows an example of the primary transfer spacing means 30 in this embodiment.

The primary transfer spacing means 30 is principally constituted by a cam shaft 32, slidable members 33a and 33b, and cam members 34a and 34b. At both ends of the cam shaft 32, the cam members 34a and 34b which have a symmetrical shape are disposed. The slidable members 33a and 33b are provided at both ends of the primary transfer rollers 12a, 12b and 12c. The slidable members 33a and 33b are moved leftward and rightward, so that positions of the primary transfer rollers 12a, 12b and 12c with respect to the respective photosensitive drums 1a, 1b and 1c can be changed.

During the color image formation, the cam members 34a and 34b are placed in a state of a phase G as shown in FIG. 9 and the slidable members 33a and 33b are held in a state of a position J. As a result, the primary transfer rollers 12a, 12b, 12c and 12d contact the intermediary transfer belt 12e so as to oppose the photosensitive drums 1a, 1b, 1c and 1d, respectively.

As shown in FIG. 10, the cam shaft 32 receives power by the drive transmission device (described later) to rotate the cam members 34a and 34b in a direction C indicated by an arrow, so that the slidable members 33a and 33b are moved in a direction D indicated by an arrow. During the monochromatic image formation, the cam members 34a and 34b are placed in a state of a phase H as shown in FIGS. 5(a) to 5(d), so that the slidable members 33a and 33b are held in a state of a position K. The primary transfer rollers corresponding to Y, M and C are moved to and held at a retracted position, in which they are retracted from the photosensitive drums 1a, 1b and 1c, by the slidable members 33a and 33b with respect to a direction opposite to an urging direction, thus being spaced from the photosensitive drums 1a, 1b and 1c. When the cam members 34a and 34b are further rotated in the indicated direction C, they are returned to the phase G state and the slidable members 33a and 33b are also returned to the position J state.

[Driving Transmission Device]

A drive transmission device 40 in this embodiment includes a driving cartridge 31 as the first coupling and a driven cartridge 42 as the second coupling, which are described below The first coupling is provided on the apparatus main assembly 100 and is rotated by power from a driving source. The second coupling is provided on the intermediary transfer unit 12 and is rotated in engagement with the first coupling.

FIGS. 3 to 8 show an example of the drive transmission device 40 in this embodiment. Hereinafter, the constitution of the drive transmission device 40 will be described.

Figure 4:
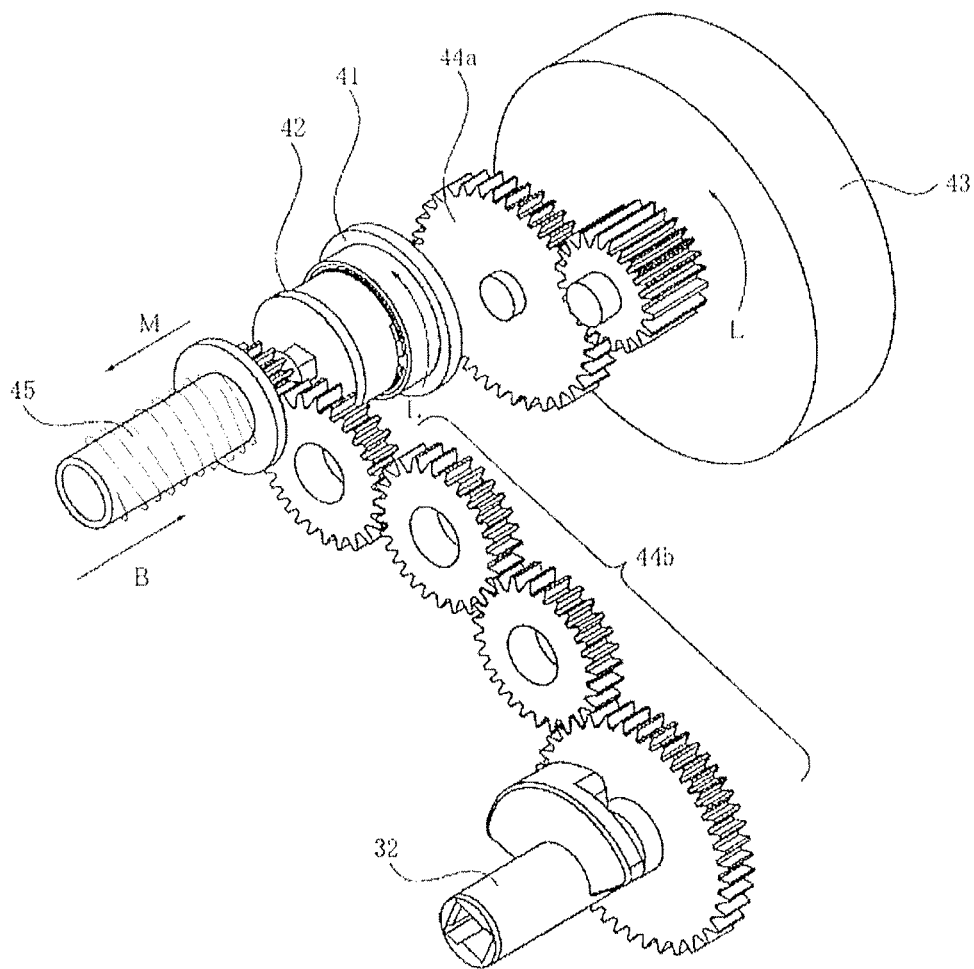
FIG. 4 is a perspective view showing a major part of a drive transmission device according to Embodiment 1 of the present invention.
Figure 5:
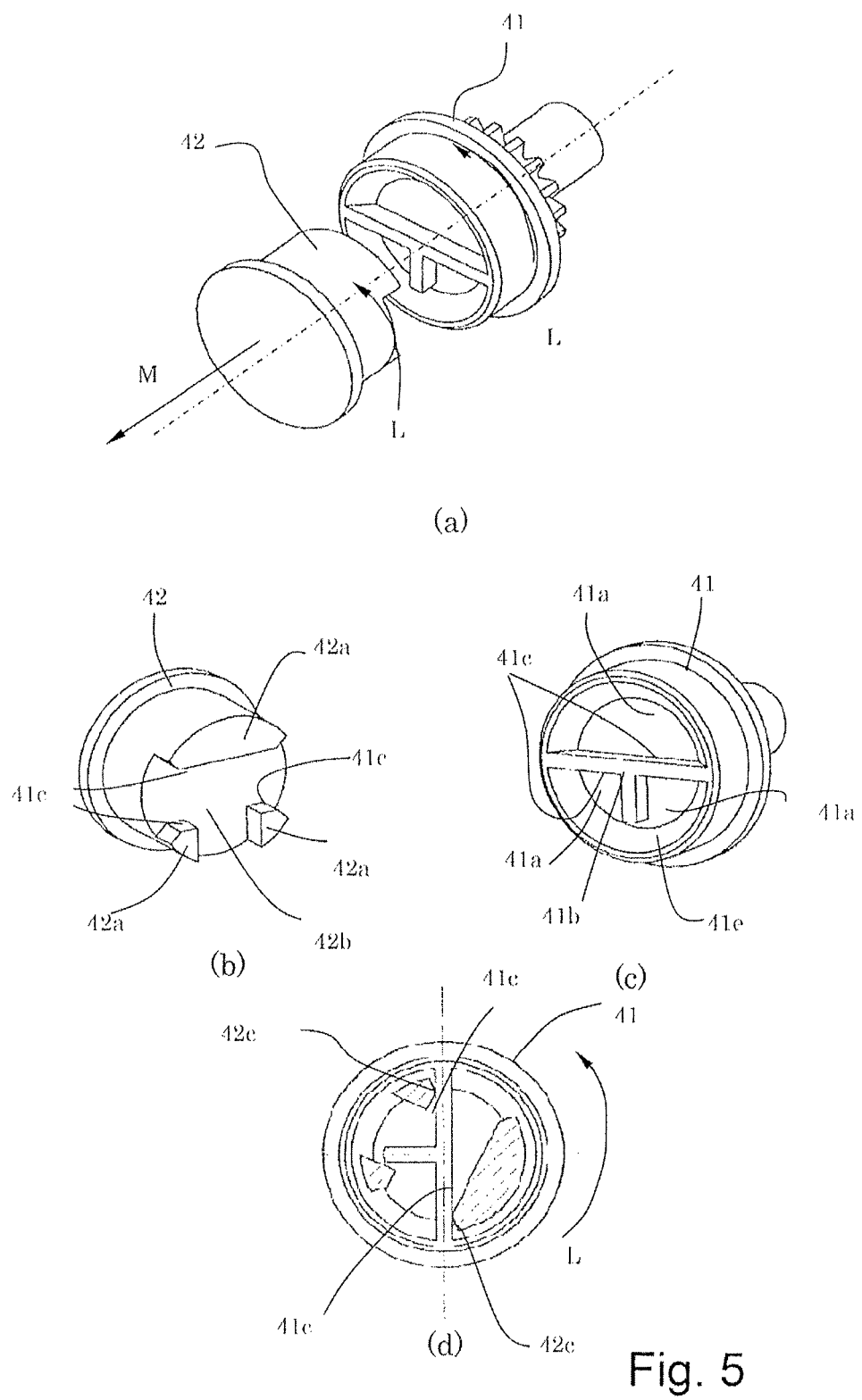
FIGS. 5(a) to 5(d) are perspective and plan views showing couplings according to Embodiment 1 of the present invention.
Figure 6:
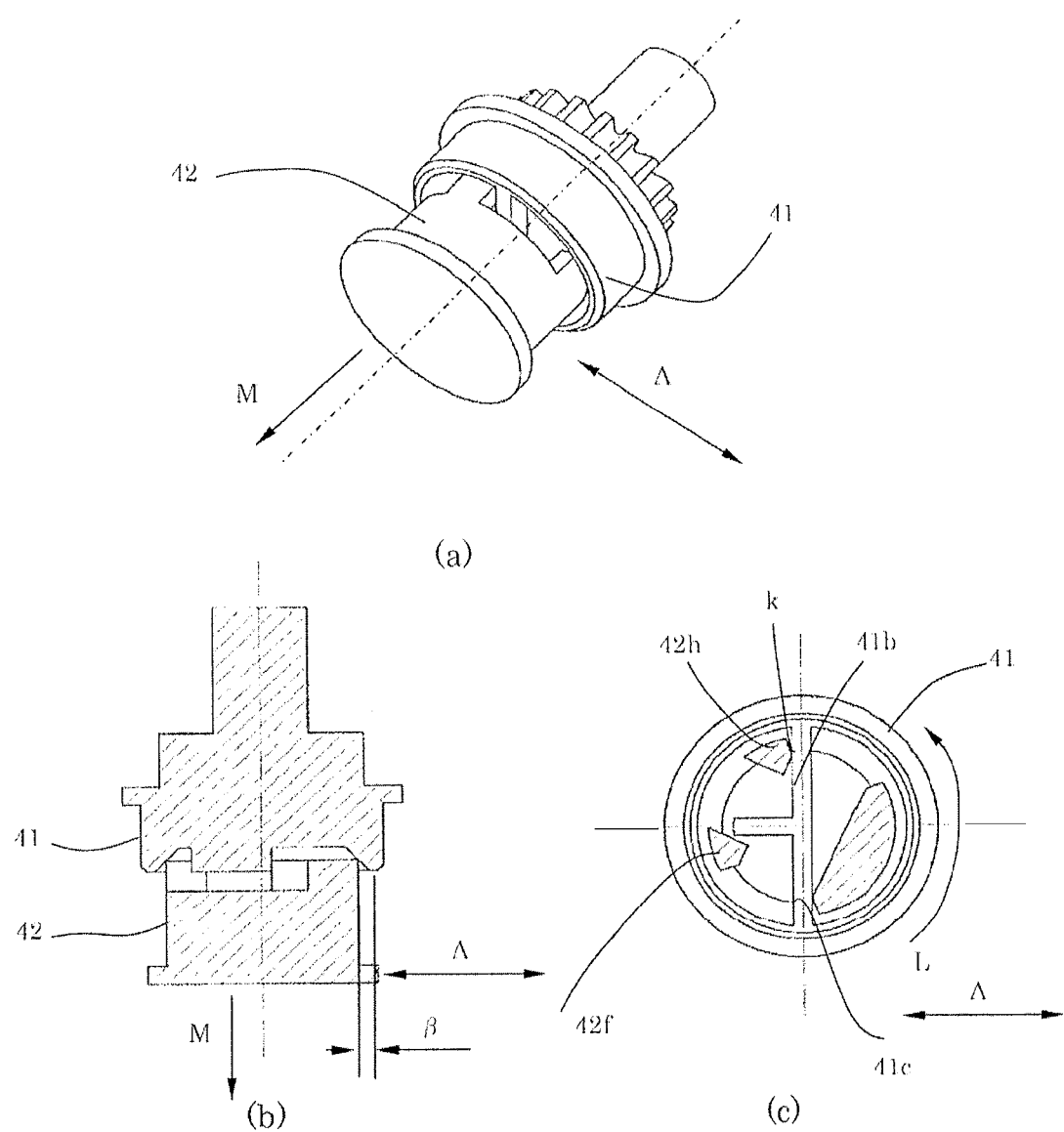
FIGS. 6(a) to 6(c) are schematic views showing a state of a driving cartridge and a driven cartridge before start of disengagement of an intermediary transfer unit according to Embodiment 1 of the present invention.
Figure 7:
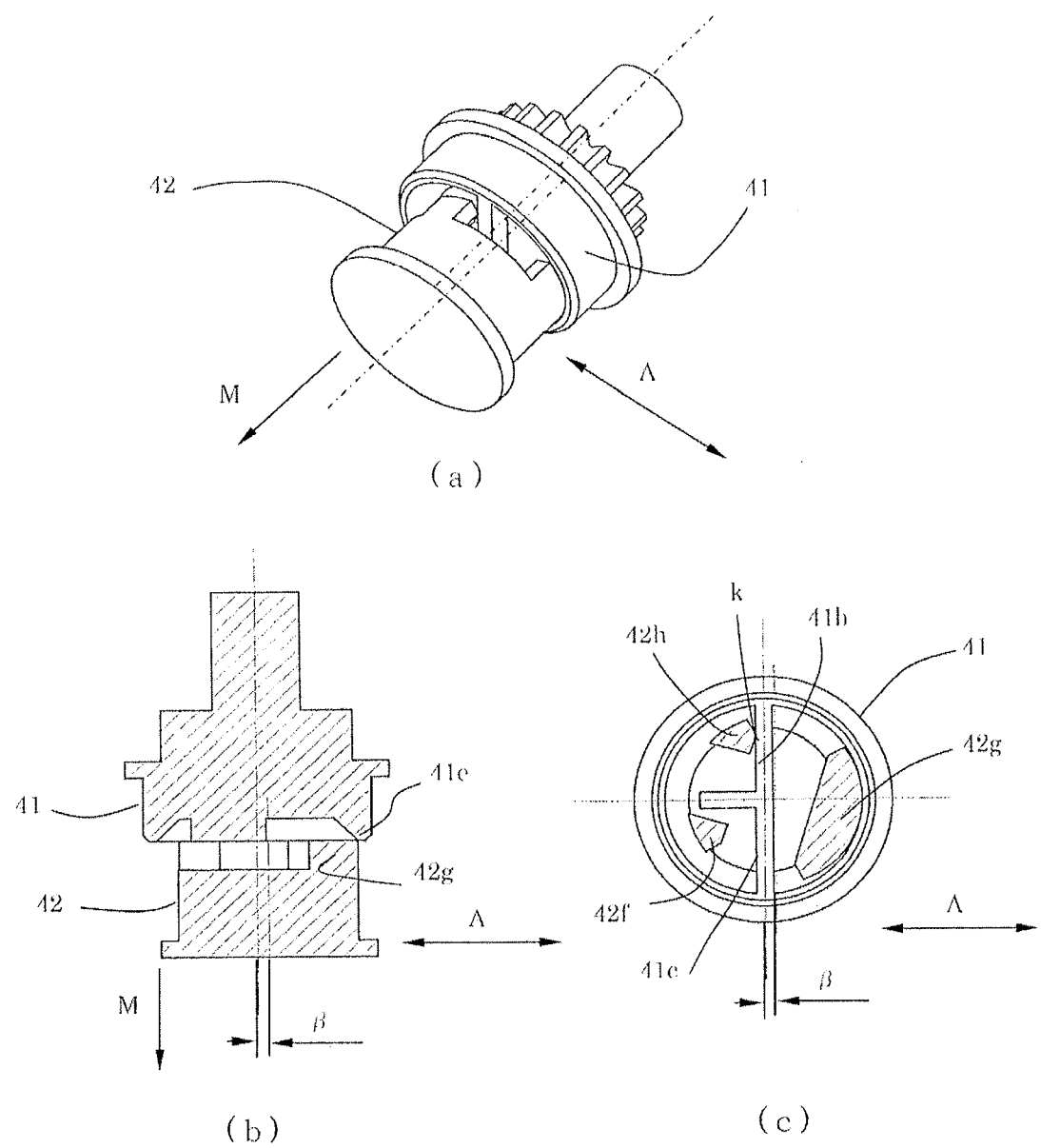
FIGS. 7(a) to 7(c) are schematic views showing a state in which contact between a first engaging portion and a second engaging portion according to Embodiment 1 of the present invention is eliminated.
Figure 8:
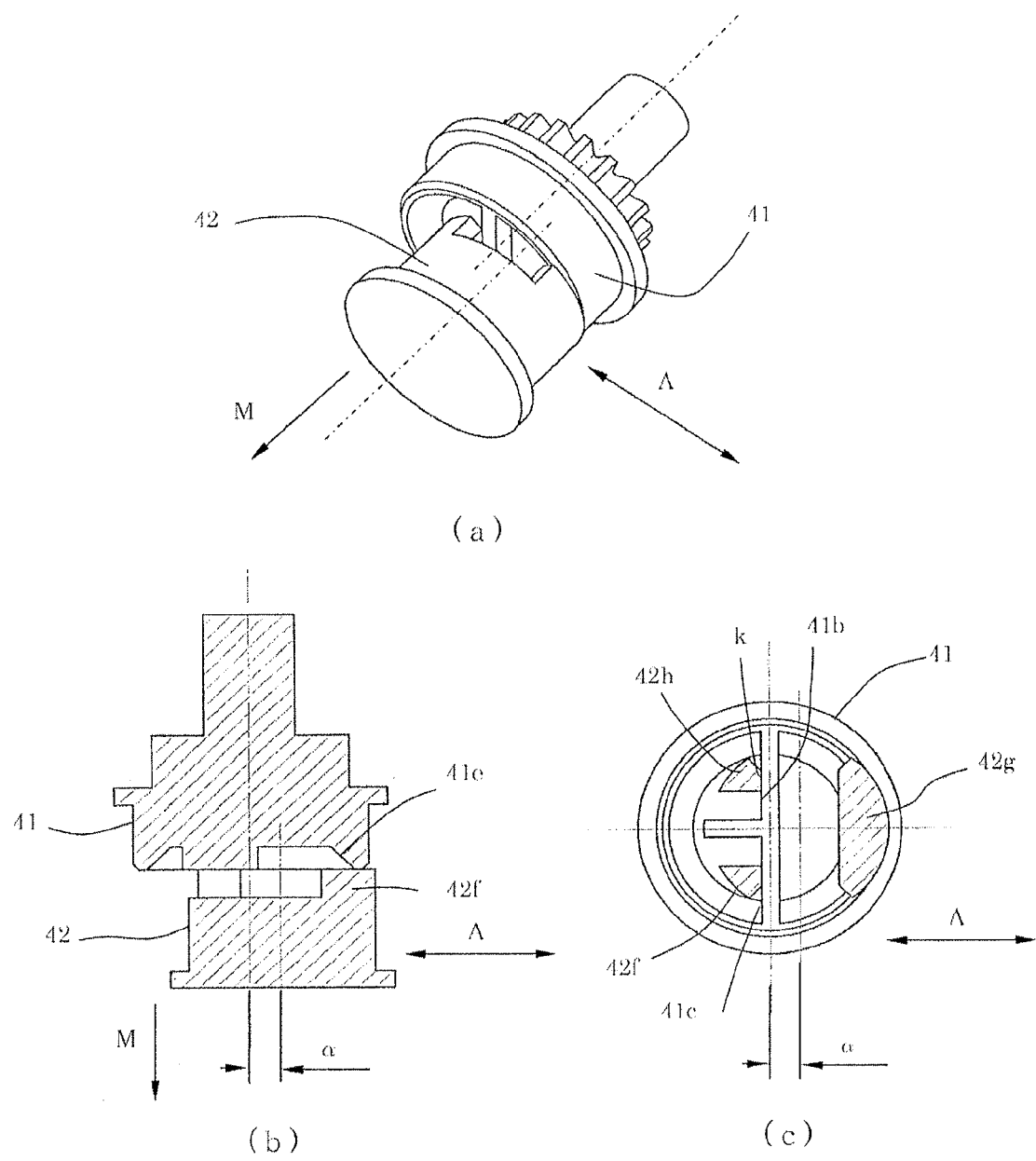
FIGS. 8(a) to 8(c) are schematic views showing a distance between a rotation shaft of the driving cartridge and a rotation shaft of the driven cartridge according to Embodiment 1 of the present invention.

To the apparatus main assembly 100, the driving cartridge 41 as the first coupling, a driving motor 43, a transmission gear 44a, and a guide member 46 are provided. The driving cartridge 41 as the first coupling is rotated by the power from the driving motor 43. To the intermediary transfer unit 12, the driven cartridge 42, an urging member 45, and a transmission gear train 44b are provided. As shown in FIG. 4, the urging member 45 is a spring and urges the driven cartridge 42 in a direction B indicated by an arrow, i.e., toward the apparatus main assembly side. The driven cartridge 42 is disposed at a position, in which it opposes the driving cartridge 41, in a state in which the intermediary transfer unit 12 is mounted in the apparatus main assembly 100. The driven cartridge 42 as the second coupling is rotatable by being engaged with the driving cartridge 41 as the first coupling.

The guide member 46 is disposed in the apparatus main assembly 100 so that it contacts the driven cartridge 42 during mounting and demounting of the intermediary transfer unit 12. Further, on an entrance side when the intermediary transfer unit 12 is mounted in the apparatus main assembly 100, an inclined surface 46a for retracting the driven cartridge 42 in a direction M indicated by an arrow is provided.

As shown in FIG. 4, the transmission gear 44a is disposed to connect the driving motor 43 and the driving cartridge 41, and the transmission gear train 44b is disposed to connect the driven cartridge 42 and the cam shaft 32.

As shown in FIGS. 5(a) and 5(c), the driving cartridge 41 provided on the apparatus main assembly 100. Further, as shown in FIGS. 5(a) and 5(b), the driven cartridge 42 has a projected shape engageable with the recessed shape. However, this embodiment is not limited to the above-described constitution but may employ a constitution in which one of the driving cartridge 41 and the driven cartridge has the recessed shape and the other coupling has the projected shape.

The driving cartridge 41 includes a T-shaped first engaging portion 41b. Further, the recessed-shape driving cartridge 41 has an inclined surface 41e at an inner peripheral surface portion thereof. The projected-shape driven cartridge 42 has second dc1 engaging portions 42a as projections. In a state in which the driving cartridge 41 and the driven cartridge 42 are engaged with each other, the second engaging portions 42a of the driven cartridge 42 oppose an inner surface 41a of the driving cartridge 41. Similarly, in the state in which the driving cartridge 41 and the driven cartridge 42 are engaged with each other, the first engaging portion 41b of the driving cartridge 41 opposes an inner surface 42b of the driven cartridge 42.

Further, the driving cartridge 41 and the driven cartridge 42 are engaged with each other in a single phase, so that the driving force can be transmitted.

Figure 3:
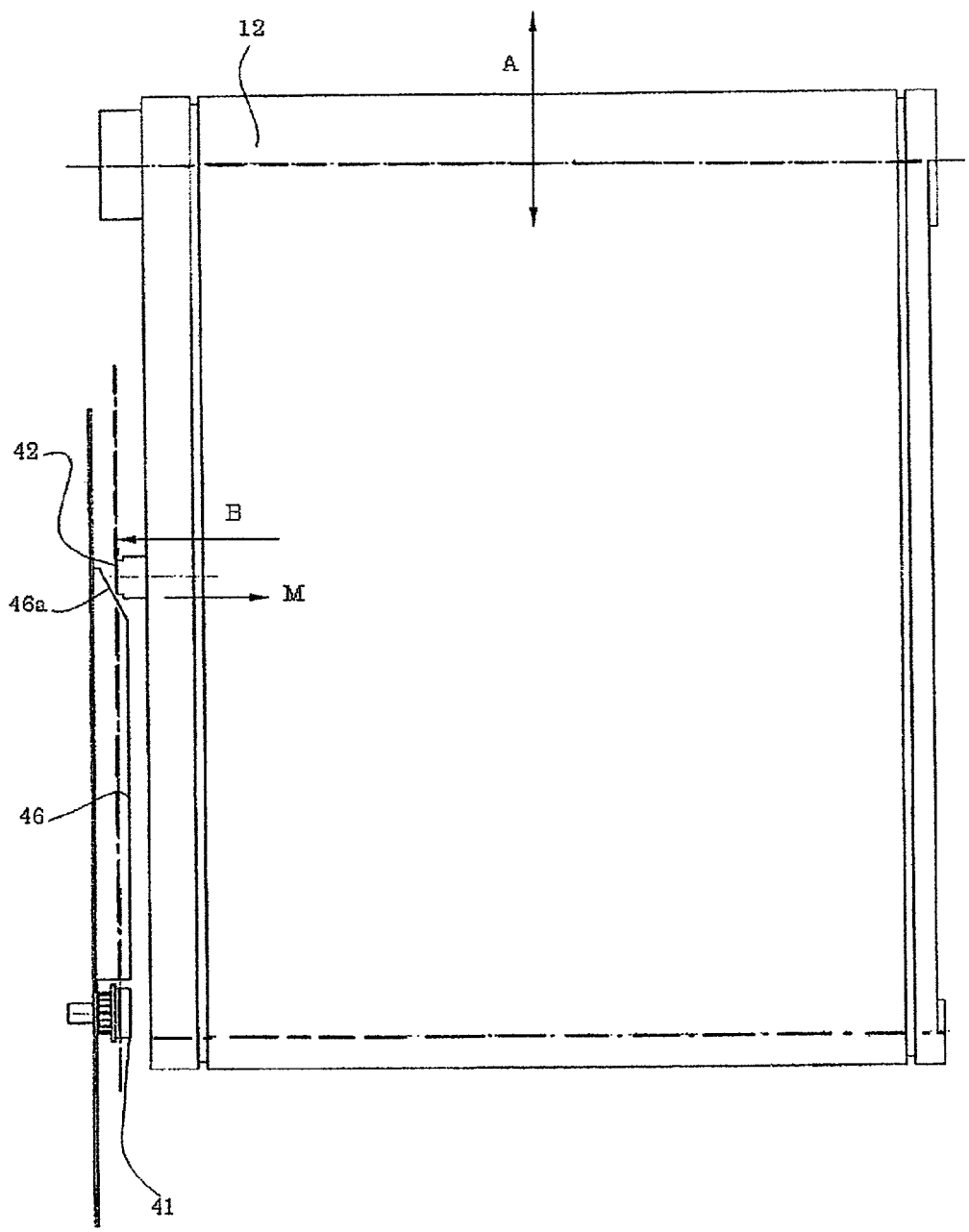
FIG. 3 is a plan view showing the mounting and demounting direction of the unit according to Embodiment 1 of the present invention.

The inclined surface 41e of the driving cartridge 41 is provided at the inner peripheral portion of the driving cartridge 41 and contacts the second engaging portions 42a of the driven cartridge 42 in the state in which the intermediary transfer unit 12 is mounted in the apparatus main assembly 100. The driven cartridge 42 is urged by the urging member 45 toward the driving cartridge 41 side in the direction B substantially perpendicular to the direction A which is a disengaging direction of the intermediary transfer unit 12 as shown in FIG. 3. The direction B is parallel to rotation shafts (rotational axes) of both of the couplings.

The driving motor 43 is rotationally driven on the basis of a control signal, so that the driving cartridge 41 is rotated in a direction L indicated by an arrow. As shown in FIG. 5(d), by the rotation of the driving cartridge 41, contact surfaces 41c of the first engaging portion 41b are engaged with contact surfaces 42c of the second engaging portions 42a. That is, the contact surfaces 41c of the first engaging portion 41b of the driving cartridge 41 to which the driving force is to be transmitted from the driving motor 43 urge the contact surface 42c portions of the second engaging portions 42a of the driven cartridge 42. As a result, a rotational force is transmitted from the driving cartridge 41 to the driven cartridge 42, so that the driven cartridge 42 is rotated in the indicated direction L. At this time, the portions 41c and 42c, to which the rotational driving force is transmitted each other, have a shape such that the force with respect to the rotational direction is transferred. The contact surfaces 41c and 42c are engaged along an axial line substantially perpendicular to the rotational direction L, so that a force by which the driven cartridge 42 is urged in the rotation shaft direction opposite to the direction B as an urging direction is not generated during the rotation.

Next, the case where the intermediary transfer unit 12 is pulled out (disengaged from) the apparatus main assembly 100 will be described. When the driving cartridge 41 and the driven cartridge 42 are engaged with each other, the second engaging portions 42a of the driven cartridge 42 contact the inclined surface 41e of the driving cartridge 41. For this reason, when a force (pulling-out force) exerted in the disengaging direction of the intermediary transfer unit 12 is exerted, a force for moving the driven cartridge 42 in the indicated direction M opposite to the urging direction B is exerted on the driven cartridge 42 by the inclined surface 41e. Thus, the driven cartridge 42 is temporarily retracted from the driving cartridge 41 in the indicated direction M. As a result, the driving cartridge 41 and the driven cartridge 42 are disengaged. Further, the driven cartridge 42 contacts the guide member 46 and is continuously retracted in the indicated direction M opposite to the urging direction B. Therefore, it is possible to pull out the intermediary transfer unit 12 from the apparatus main assembly 100.

This will be described more specifically with reference to FIGS. 6(a) to 6(c) and FIGS. 7(a) to 7(c). FIGS. 6(a) to 6(c) show a state of the driving cartridge and the driven cartridge before start of disengagement of the intermediary transfer unit, and FIGS. 7(a) to 7(c) show a state in which the first engaging portion 41b and the second engaging portions 42a are disengaged.

FIG. 6(a) and FIG. 7(a) are perspective views showing the state of the driving cartridge 41 and the driven cartridge 42, and FIG. 6(b) and FIG. 7(b) are schematic views showing the state of the driving cartridge 41 and the driven cartridge as seen from the direction perpendicular to the rotation shaft. FIG. 6(c) and FIG. 7(c) are schematic views showing the state of the driving cartridge 41 and the driven cartridge 42 as seen from the direction parallel to the rotation shafts.

Before the intermediary transfer unit is disengaged, as shown in FIG. 6(b), of the second engaging portions 42a, the second engaging portion (represented by 42f in FIG. 6(c); hereinafter referred to as the second engaging portion 42f) of the driven cartridge located on the uppermost-stream side with respect to the intermediary transfer unit disengaging direction, and the contact surface 41c of the first engaging portion 41b of the driving cartridge are configured to create a sufficient gap therebetween with respect to the rotational direction. When the intermediary transfer unit is pulled out from the apparatus main assembly in the direction perpendicular to the rotation shaft of the rotation shaft of the driving cartridge 41, by the force exerted in the disengaging direction of the intermediary transfer unit, the driven cartridge 42 is rotated so that the driven cartridge 42 approaches the contact surface 41c. At this time, the driven cartridge 42 is located at, as a center of the rotational movement, a position which is different from a position of the rotation shaft of the driving cartridge 41 and in which the driving cartridge 41 and the driven cartridge 42 contact each other. As shown in FIG. 6(c) and FIG. 7(c), the second engaging portion located between the second engaging portion 42f and the first engaging portion 41b is represented by 42h. A position k in which the second engaging portion 42h and the contact surface 41c contact each other is referred to as a center k of the rotational movement in this embodiment.

When the driven cartridge 42 is started to be rotationally moved about the position k, the second engaging portion 42f approaches the contact surface 41c of the first engaging portion, so that the gap between the second engaging portion 42f and the contact surface 41c is decreased. When the driven cartridge 42 is rotationally moved, of the second engaging portions 42a, the second engaging portion (represented by 42g in FIG. 7(c); hereinafter referred to as the second engaging portion 42g) of the driven cartridge located on the lowermost-stream side with respect to the intermediary transfer unit disengaging direction is moved the disengaging direction of the intermediary transfer unit along the inclined surface 41e of the driving cartridge. When the second engaging portion 42g is moved along the inclined surface 41e, the driven cartridge 42 is retracted in the direction M in FIGS. 7(a) and 7(b). As a result, as shown in FIGS. 7(a) and 7(b), the engagement between the first engaging portion and the second engaging portions is released. That is, the contact surfaces 42c of the second engaging portion are spaced from the contact surfaces 41c of the first engaging portion. As shown in FIGS. 7(b) and 7(c), until the second engaging portions 42a and the first engaging portion 41b are disengaged, a distance at which the rotation shaft of the rotation shaft of the driven cartridge 42 is moved in the unit disengaging direction relative to the rotation shaft of the driving cartridge 41 is $\beta$.

Next, a structure such that the rotation shaft of the driven cartridge 42 is more movable than the rotation shaft of the driving cartridge 41 in the unit disengaging direction by the force exerted in the disengaging direction of the unit when the unit is pulled out from the apparatus main assembly in the direction perpendicular to the rotation shaft of the driving cartridge 41 will be described. As is understood from FIGS. 5(a) to 5(d), the driven cartridge 42 is provided with a sufficient area in which the driving cartridge 41 is to be engaged. That is, in the case where the driving cartridge 41 and the driven cartridge 42 are engaged with each other and are rotated, a gap is created therebetween.

As shown in FIGS. 8(a) to 8(c), a maximum distance at which the rotation shaft of the driven cartridge 42 is movable in the unit disengaging direction with respect to the rotation shaft of the driving cartridge 41 is $\alpha$. In this embodiment, $\alpha$ is configured to be larger than $\beta$. $\alpha$ is larger than $\beta$, so that when the driven cartridge 42 is rotationally moved about the position k, the retraction of the driven cartridge 42 into the direction M is completed before the second engaging portion 42f contact the first engaging portion 41b.

That is, in the coupling constitution in this embodiment, the engagement between the driven cartridge 42 and the driving cartridge 41 is released only by pulling out the intermediary transfer unit 12 from the apparatus main assembly 100, so that the first engaging portion 41b and the second engaging portion 42a are disengaged.

Contrary to the above, in the case where the intermediary transfer unit 12 is mounted in the image forming apparatus main assembly 100, the driven cartridge 42 contacts the guide member 46 of the apparatus main assembly 100, so that the driven cartridge 42 is retracted in the indicated direction M. As a result, the driven cartridge 42 can be smoothly moved to an engaging position with the driving cartridge 41. Further, in a state in which the rotation shaft (rotational axis) of the driven cartridge 42 and the rotation shaft (rotational axis) substantially coincide with each other, as described above, the couplings engage with each other when rotational phases of the couplings are in phase with each other, so that the mounting of the intermediary transfer unit 12 into the apparatus main assembly 100 is completed.

In this embodiment, by the engagement at a single phase, it is possible to transmit the driving force from the driving cartridge 41 to the driven cartridge 42. As a result, on the basis of an amount of rotation of the driving motor 43, it is possible to control the phase of the driven cartridge, i.e., the phase of the cam shaft 32 in this embodiment.

Further, this embodiment may only have a constitution in which one of the outer peripheral portion of the projected-shape coupling and the inner peripheral portion of the recessed-shape coupling has the inclined surface 41e. Further, as shown in FIGS. 11(a) to 11(c), it is also possible to employ a constitution in which the second engaging portion 42a of the driven cartridge 42 also have the inclined surface, i.e., a constitution in which both of the outer peripheral portion of the projected-shape state and the inner peripheral portion of the recessed-shape state have the inclined surface. When both of the driving cartridge 41 and the driven cartridge 42 are provided with the inclined surface, the driven cartridge 42 can be further smoothly retracted in the indicated direction M opposite to the urging direction B. Incidentally, in the case of the phase shown in FIG. 12(a), the driven cartridge 42 is rotationally moved about the position k shown in FIG. 12(a), so that the driven cartridge 42 can be retracted along the inclined surface in the direction M. Further, in the case of the phase shown in FIG. 12(b), the driven cartridge 42 can be retracted along the inclined surface in the direction M by the force exerted in the unit disengaging direction without being rotationally moved about the contact position between the second engaging portion 42a and the first engaging portion 41b.

Embodiment 2

In this embodiment, a drive transmission device in which a driving cartridge 51 and a driven cartridge 52 are engaged with each other at a plurality of phases will be described. All the constitutions other than the drive transmission device are similar to those in Embodiment 1.

Figure 13:
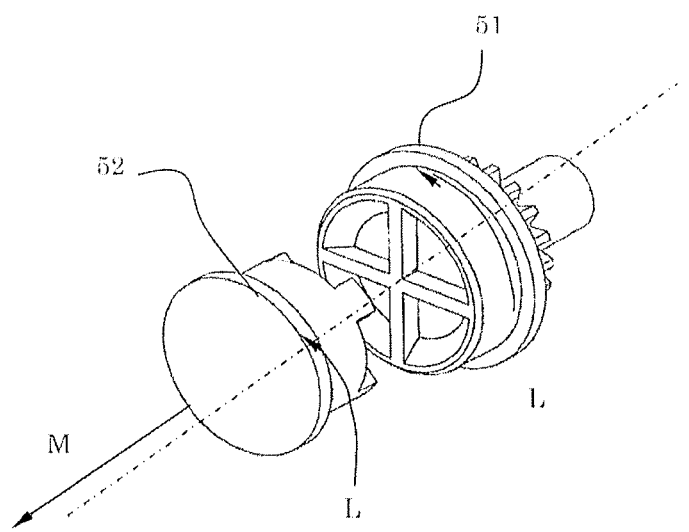
FIGS. 13(a) to 13(c) are perspective views showing couplings according to Embodiment 2 of the present invention.
Figure 13:
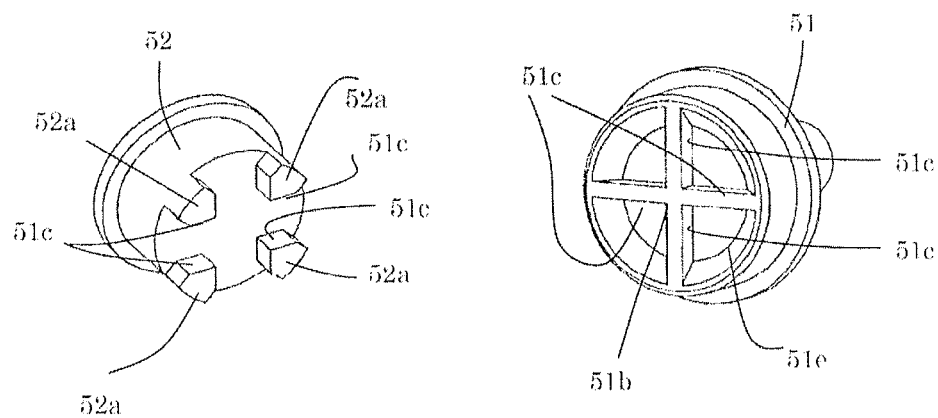
Figure 14:
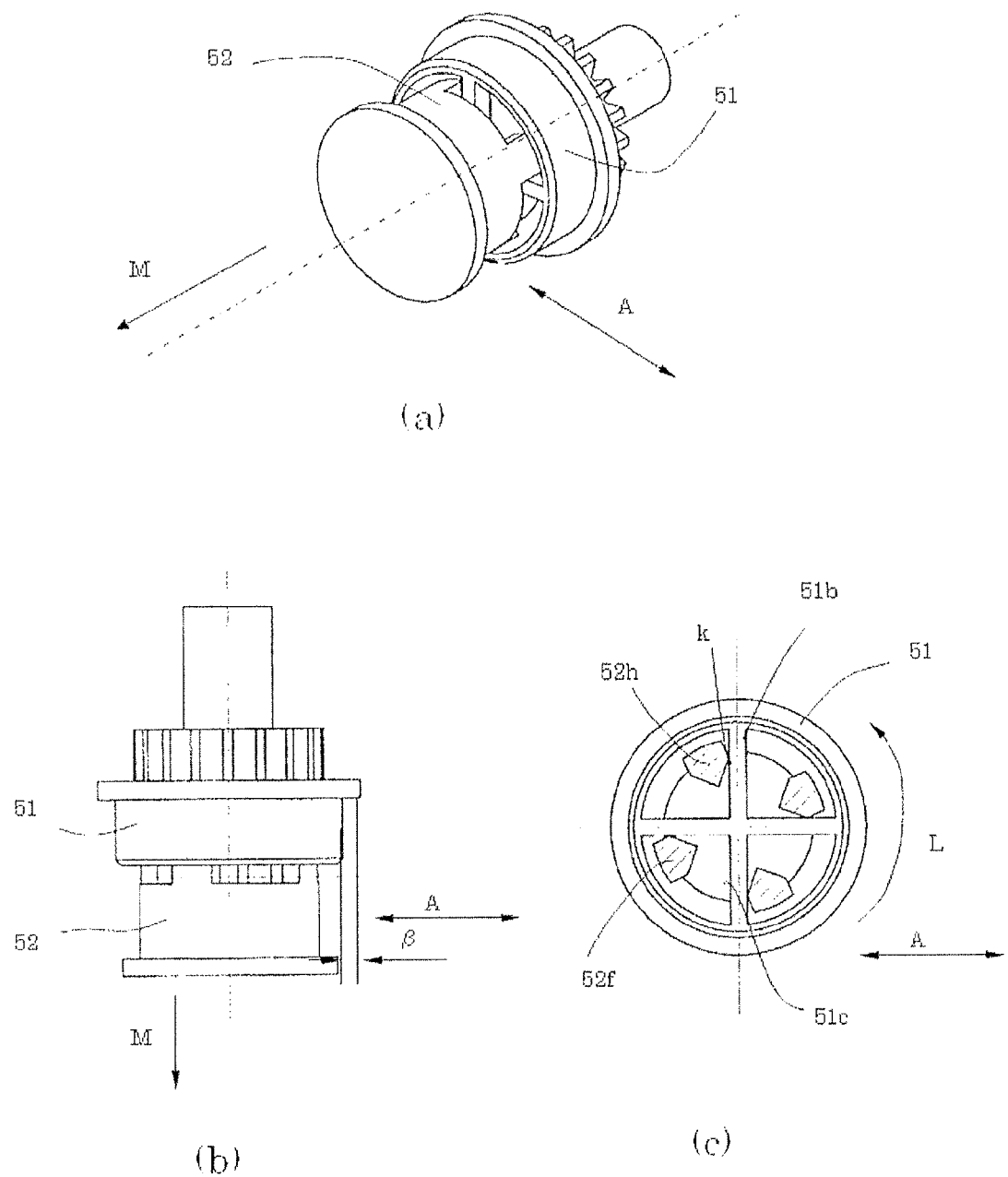
FIGS. 14(a) to 14(c) are schematic views showing a state of a driving cartridge and a driven cartridge before start of disengagement of an intermediary transfer unit according to Embodiment 2 of the present invention.
Figure 15:
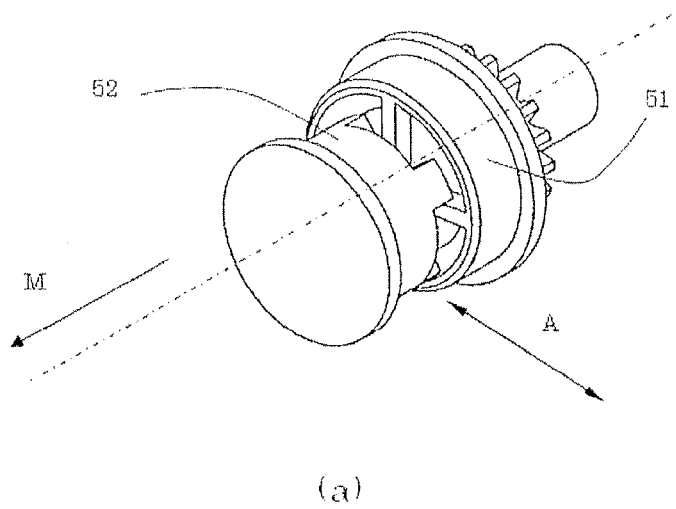
FIGS. 15(a) to 15(c) are schematic views showing a state in which contact between a first engaging portion and a second engaging portion according to Embodiment 2 of the present invention is eliminated.
Figure 15:
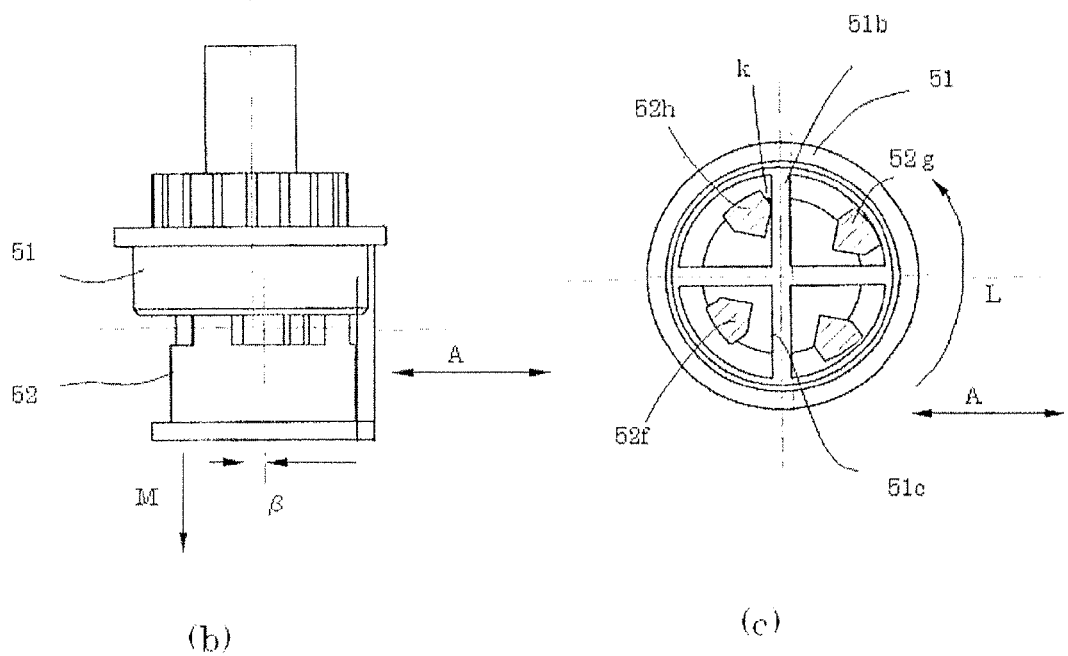

In the case where there is no need to control the phase on an objective unit side by the driving motor provided on the main assembly side, a similar effect can be obtained also in the constitution of the couplings shown in FIGS. 13(a) to 13(c). For example, a drive transmission device or the like for rotating unit-side rollers or the like in a predetermined direction corresponds to the constitution.

In FIGS. 13(a) to 13(c), a reference numeral 51 represents a driving cartridge corresponding to the driving cartridge 4 in Embodiment 1 and a reference numeral 52 represents a driven cartridge corresponding to the driven cartridge 42 in Embodiment 1.

The couplings in this embodiment are similar to those in Embodiment 1 except that engaging portions of the driving cartridge 51 and the driven cartridge 52 are different in shape from the couplings in Embodiment 1.

As shown in FIGS. 14(a) to 14(c) and FIGS. 15(a) to 15(c), similarly as in Embodiment 1, a distance at which the rotation shaft of the driven cartridge 52 is moved in the unit disengaging direction with respect to the rotation shaft of the driving cartridge 51 until a second engaging portion 52a and a first engaging portion 51b are disengaged is β.

Figure 16:
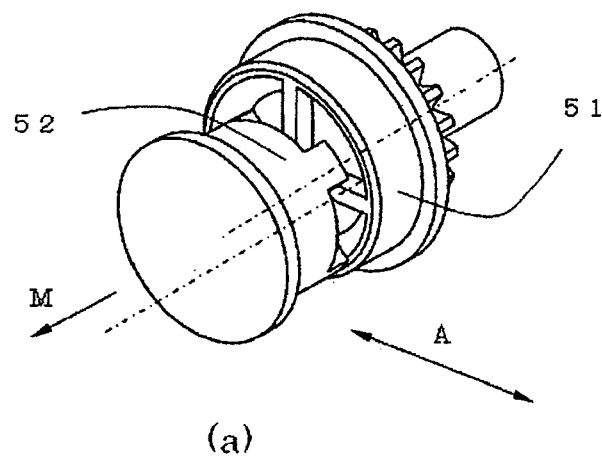
FIGS. 16(a) to 16(c) are schematic views showing a distance between a rotation shaft of the driving cartridge and a rotation shaft of the driven cartridge according to Embodiment 2 of the present invention.
Figure 16:
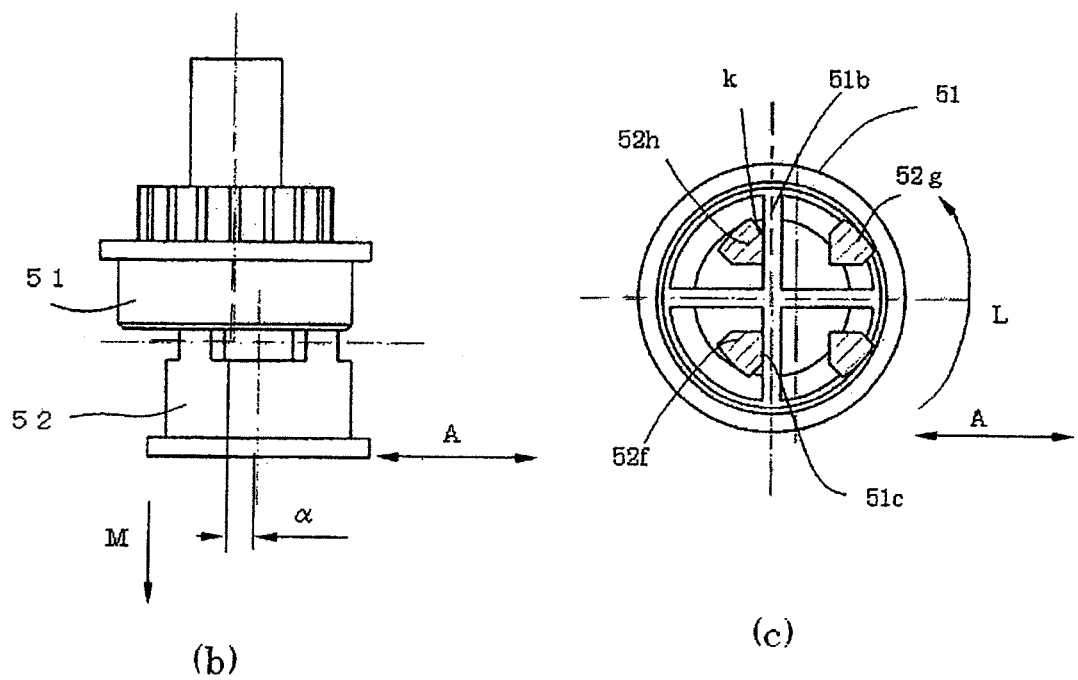

Further, as shown in FIGS. 16(a) to 16(c), similarly as in Embodiment 1, a maximum distance at which the rotation shaft of the driven cartridge 52 is movable in the unit disengaging direction with respect to the rotation shaft of the driving cartridge 51 is α. α is larger than β, so that when the driven cartridge 52 is rotationally moved about the position k, the retraction of the driven cartridge 52 into the direction M is completed before a second engaging portion 52f contacts the first engaging portion 51b.

Figure 17:
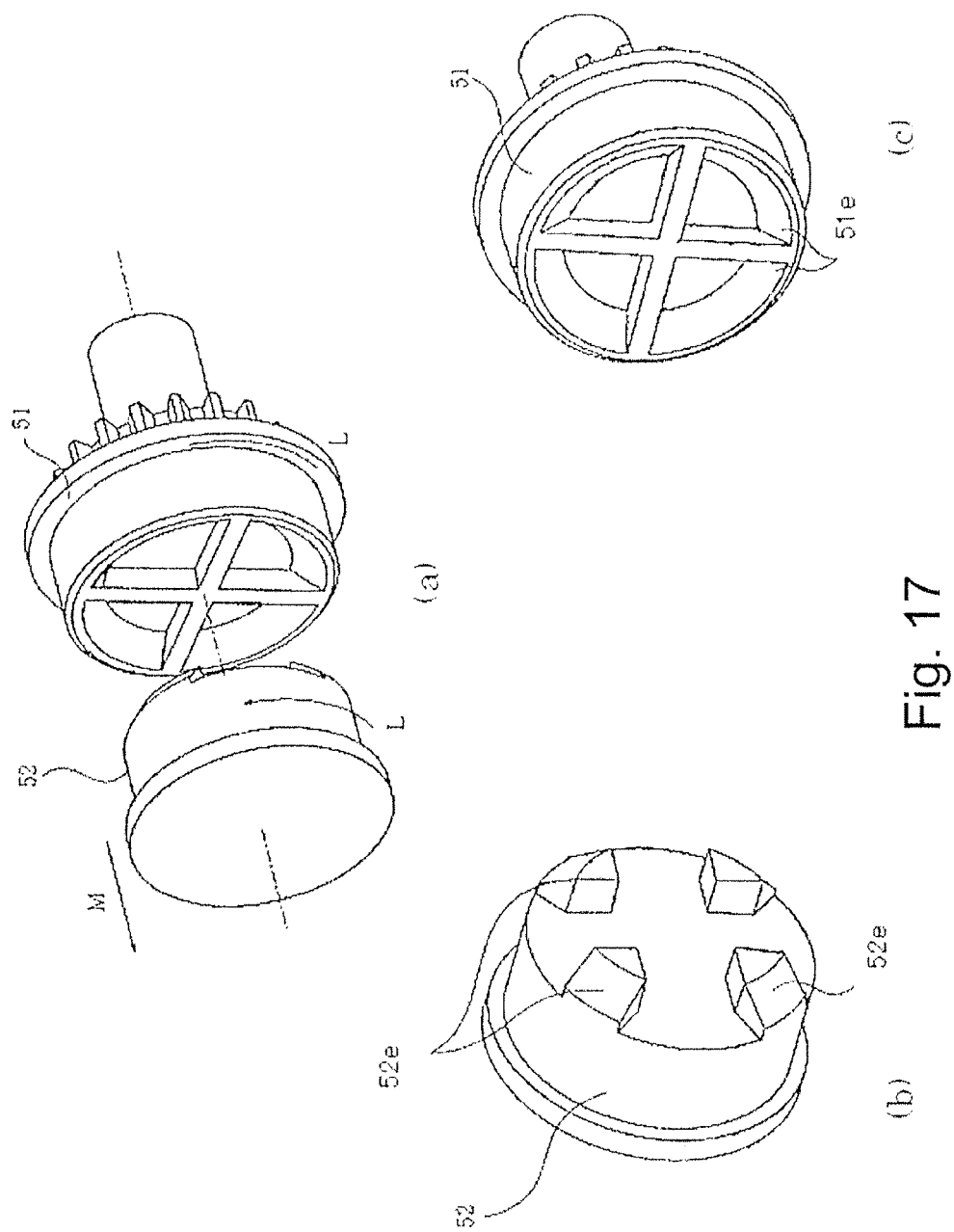
FIGS. 17(a) to 17(c) are perspective views showing other couplings according to Embodiment 2 of the present invention.

Further, as shown in FIGS. 17(a) to 17(c), the second engaging portion 52a of the driven cartridge 52 may also have an inclined surface 51e. When both of the driving cartridge 51 and the driven cartridge 52 are provided with the inclined surface, the driven cartridge 52 can be further smoothly retracted in the direction M opposite to the urging direction B.

Embodiment 3

In this embodiment, a drive transmission device in which a driving cartridge 61 and a driven cartridge 62 are engaged with each other at a plurality of phases will be described. All the constitutions other than the drive transmission device are similar to those in Embodiment 1.

Similarly as in Embodiment 2, the drive transmission device can be used in the case where there is no need to control the phase on an objective unit side by the driving motor provided on the main assembly side.

Figure 18:
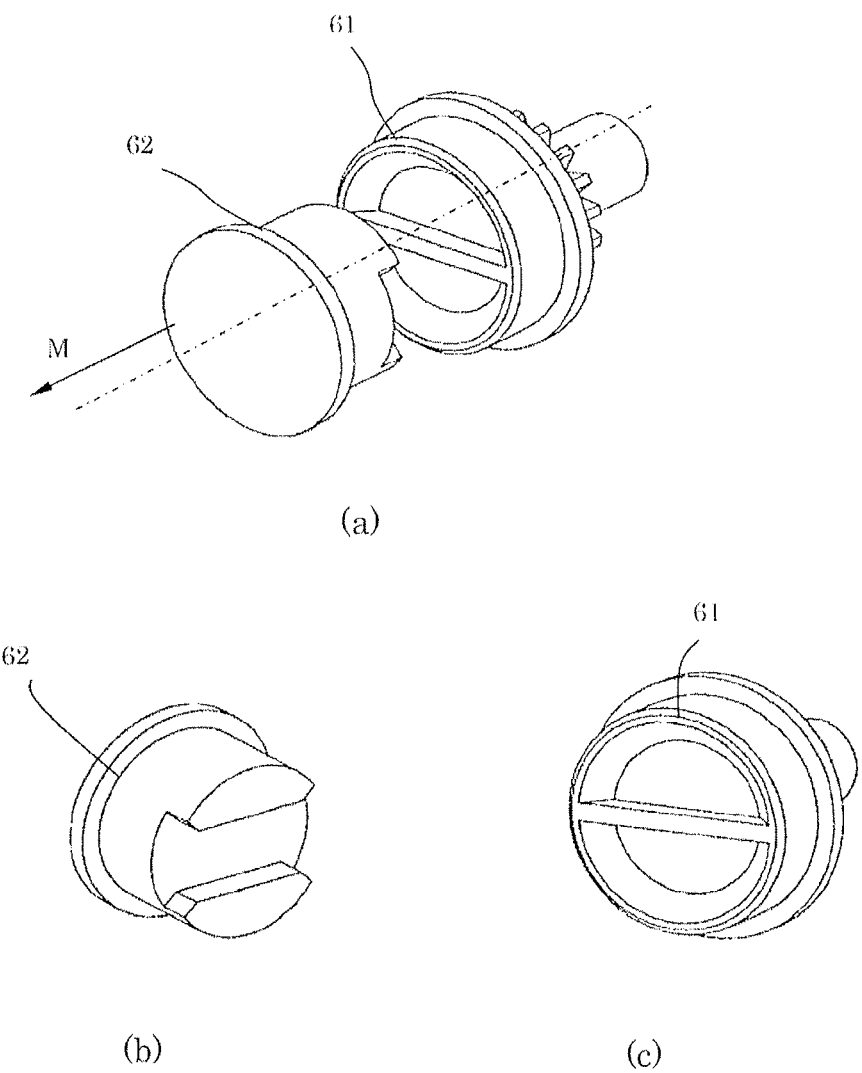
FIGS. 18(a) to 18(c) are perspective showing couplings according to Embodiment 3 of the present invention.
Figure 19:
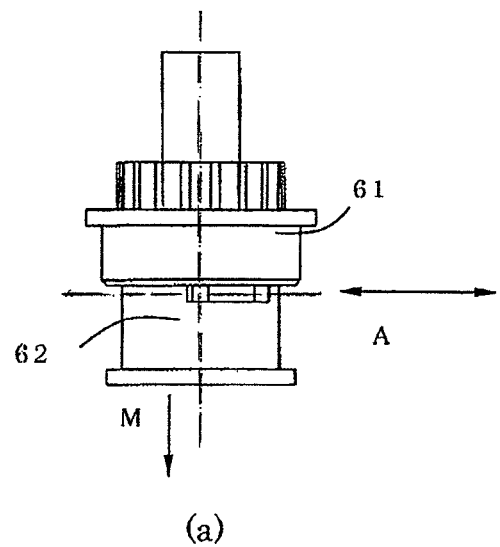
FIGS. 19(a) to 19(c) are schematic views showing a state of a driving cartridge and a driven cartridge before start of disengagement of an intermediary transfer unit according to Embodiment 3 of the present invention.
Figure 19:
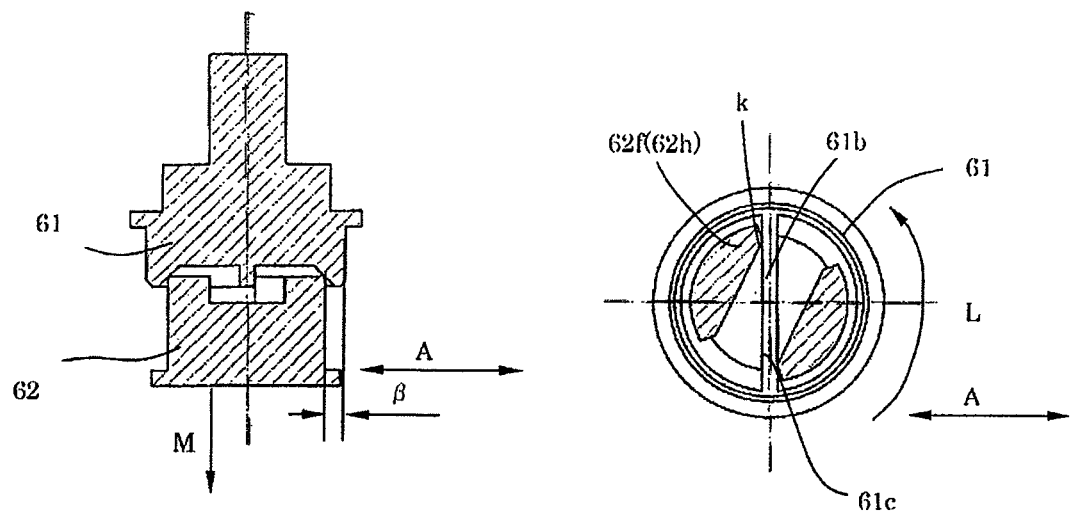
Figure 20:
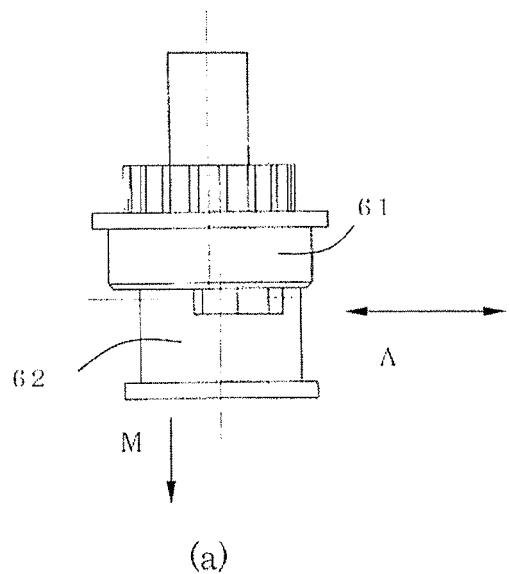
FIGS. 20(a) to 20(c) are schematic views showing a state in which contact between a first engaging portion and a second engaging portion according to Embodiment 3 of the present invention is eliminated.
Figure 20:
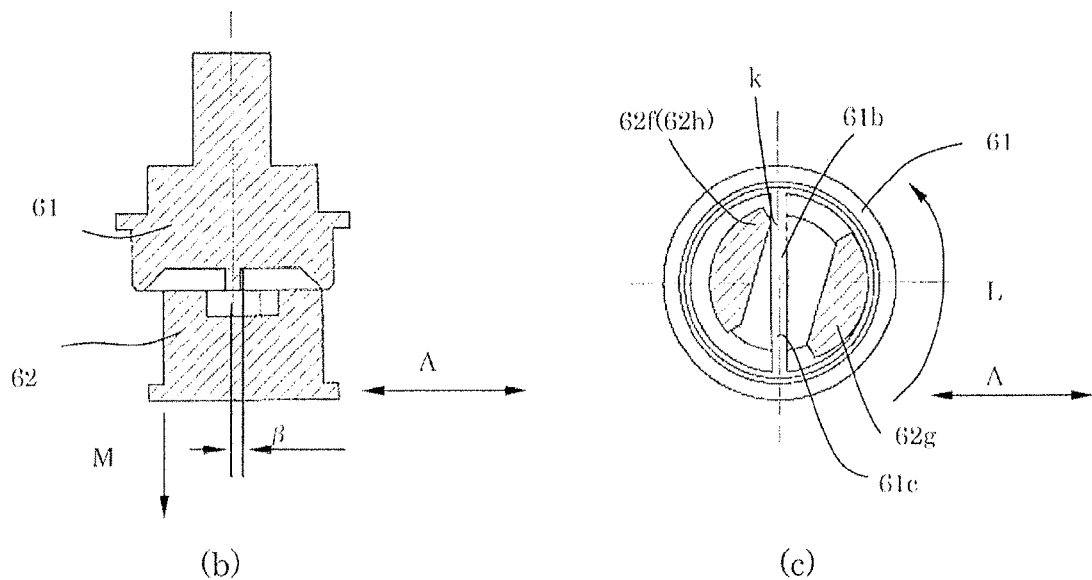

In FIGS. 18(a) to 18(c), a reference numeral 61 represents a driving cartridge corresponding to the driving cartridge 4 in Embodiment 1 and a reference numeral 62 represents a driven cartridge corresponding to the driven cartridge 42 in Embodiment 1.

The couplings in this embodiment are similar to those in Embodiment 1 except that engaging portions of the driving cartridge 61 and the driven cartridge 62 are different in shape from the couplings in Embodiment 1.

As shown in FIGS. 19(a) to 19(c) and FIGS. 20(a) to 20(c), similarly as in Embodiment 1, a distance at which the rotation shaft of the driven cartridge 62 is moved in the unit disengaging direction with respect to the rotation shaft of the driving cartridge 61 until a second engaging portion 62a and a first engaging portion 61b are disengaged is β.

Figure 21:
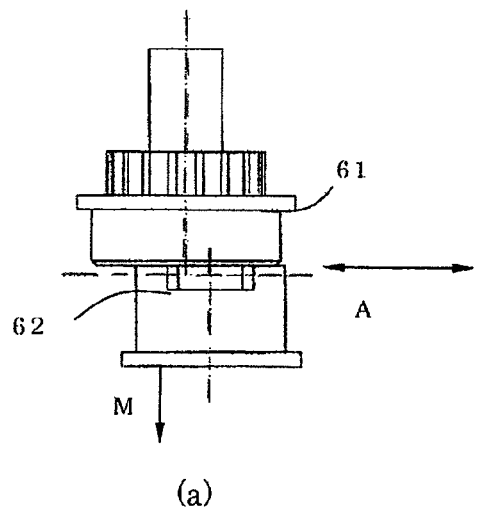
FIGS. 21(a) to 21(c) are schematic views showing a distance between a rotation shaft of the driving cartridge and a rotation shaft of the driven cartridge according to Embodiment 3 of the present invention.
Figure 21:
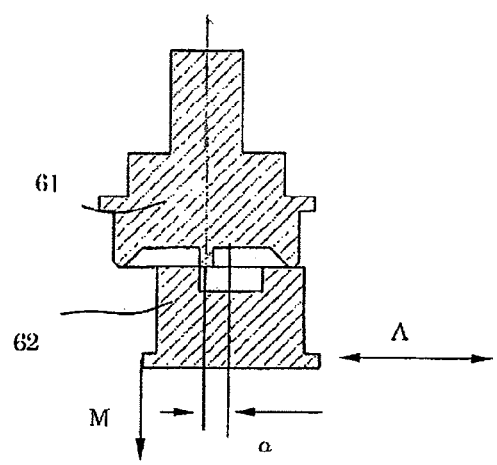
Figure 21:
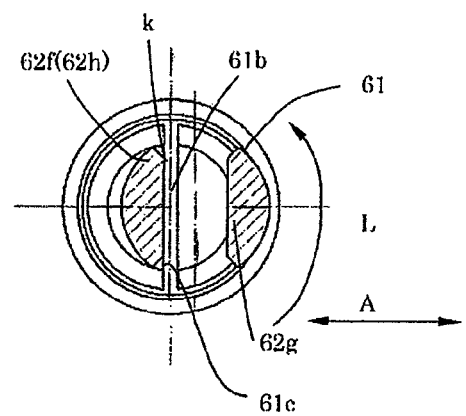
Figure 22:
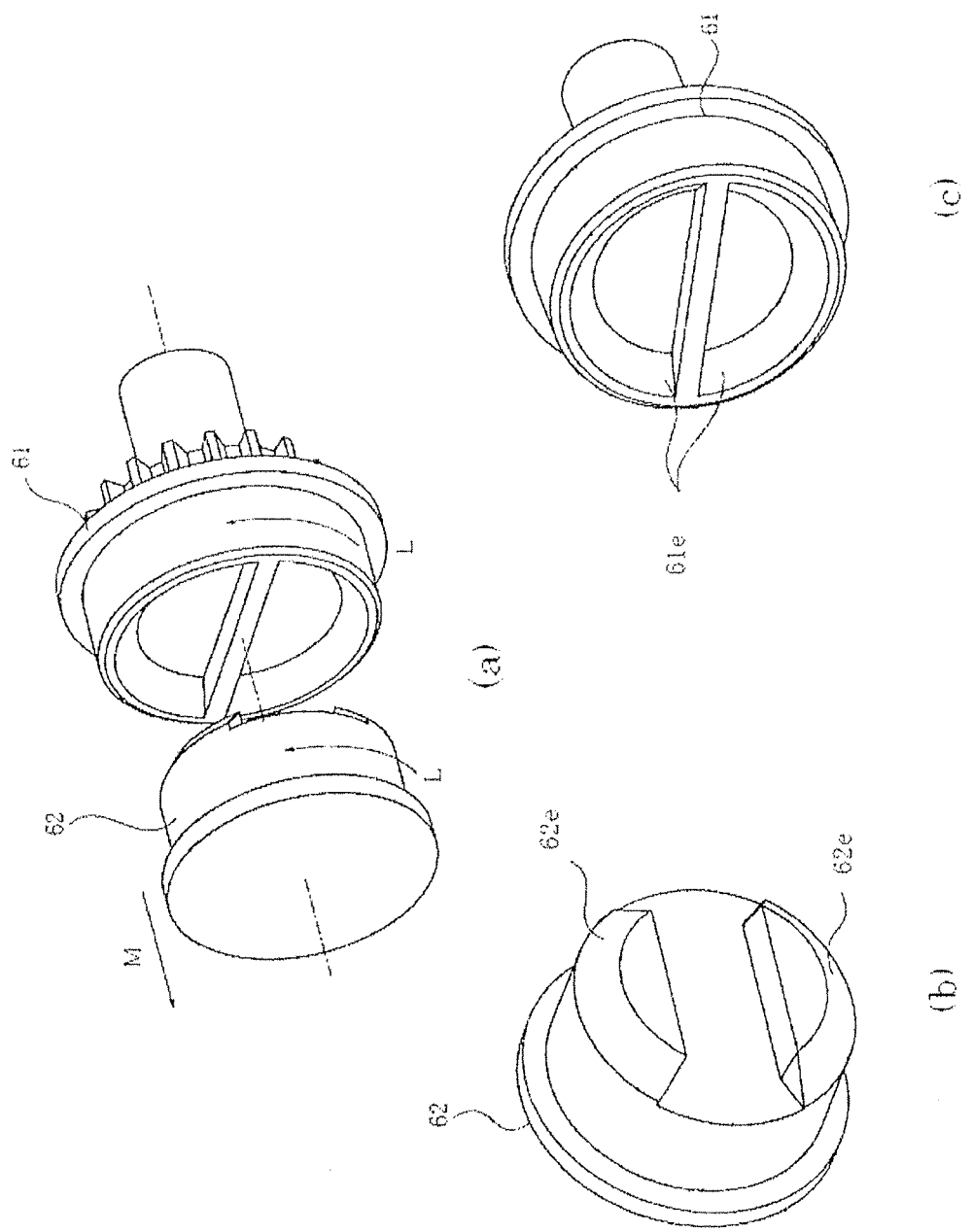
FIGS. 22(a) to 22(c) are perspective views showing other couplings according to Embodiment 3 of the present invention.

Further, as shown in FIGS. 21(a) to 21(c), similarly as in Embodiment 1, a maximum distance at which the rotation shaft of the driven cartridge 62 is movable in the unit disengaging direction with respect to the rotation shaft of the driving cartridge 61 is α. α is larger than β, so that the driven cartridge 62 can be smoothly retracted from the driving cartridge 61.

Further, as shown in FIGS. 21(a) to 21(c), the second engaging portion 62a of the driven cartridge 62 may also have an inclined surface 61e. When both of the driving cartridge 61 and the driven cartridge 62 are provided with the inclined surface, the driven cartridge 62 can be further smoothly retracted in the direction M opposite to the urging direction B.

Embodiment 4

Figure 23:
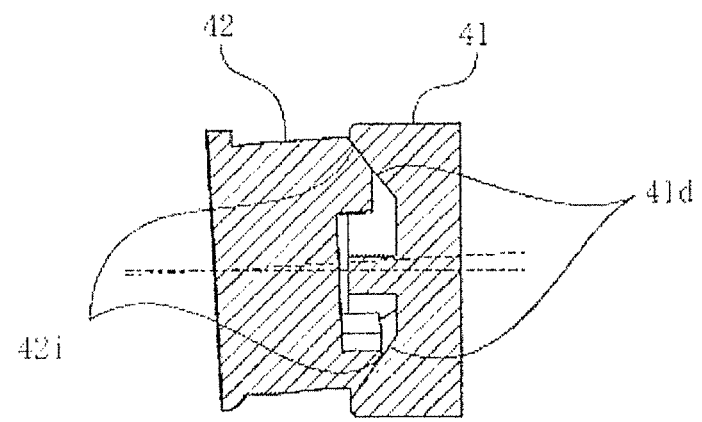
FIG. 23 includes sectional and perspective views showing the couplings according to Embodiment 4 of the present invention.
Figure 23:
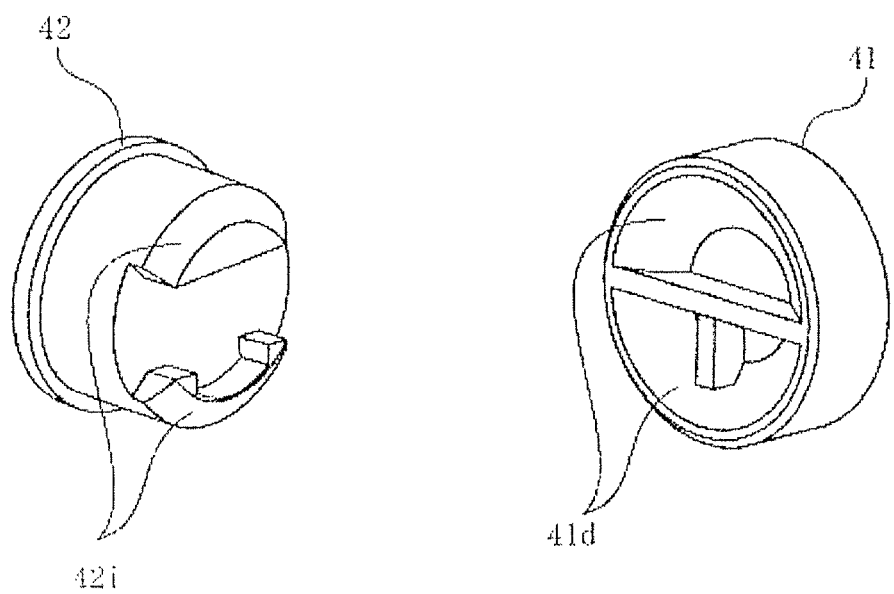

In this embodiment, a function in the case where the driving cartridge 51 has an arcuate surface 42i and the arcuate surface abuts and contacts the driving cartridge 41 in the drive transmission device described in Embodiment 1 will be described with reference to FIGS. 23(a) to 23(c). The reference numerals or symbols shown in FIGS. 23(a) to 23(c) are identical to those used in Embodiment 1.

The driven cartridge 42 is urged toward the driving cartridge 41 side by the urging member 45 and the arcuate surface 42i is configured to contact the inclined surface 41e of the driving cartridge 41 to determine a shaft direction position of the driven cartridge 42.

Here, with respect to the apparatus main assembly 100, also in the case where the position of the mounted intermediary transfer unit 12 is deviated within a range of variation, by employing the constitution in this embodiment, the rotational force can be transmitted even when eccentricity due to the positional deviation occurs to some extent.

Other Embodiments

Figure 24:
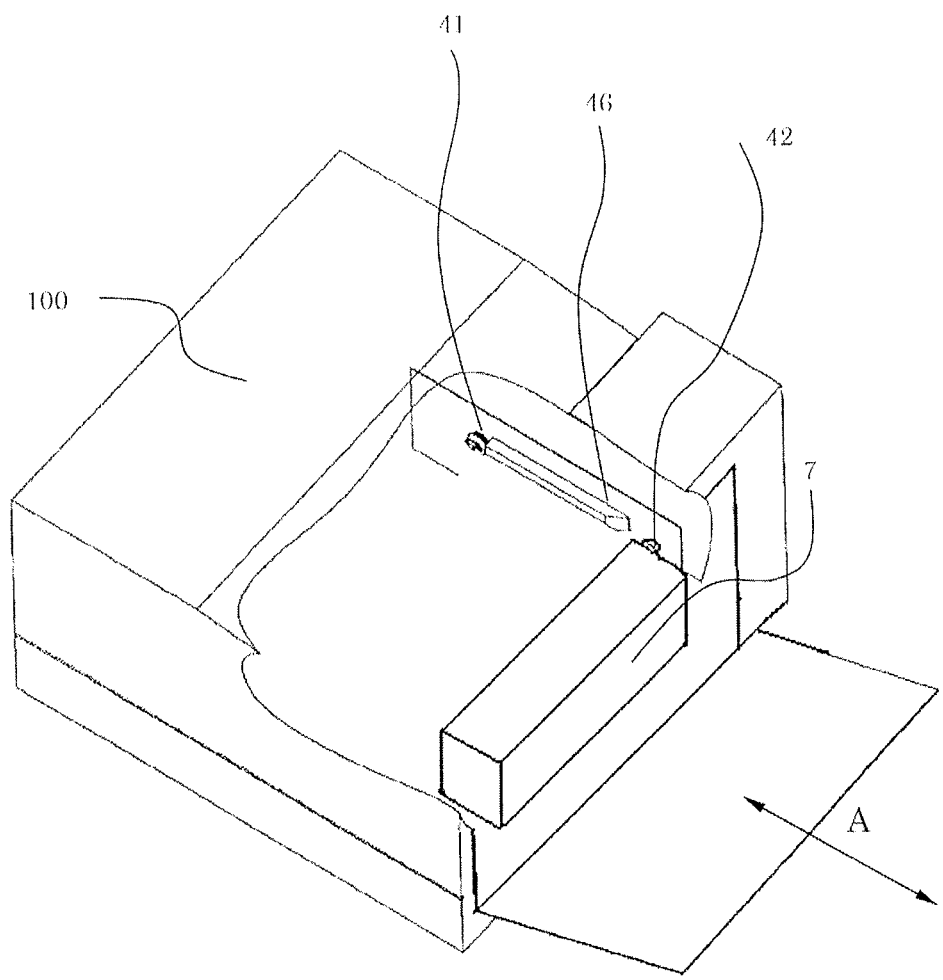
FIG. 24 is a perspective view showing a mounting and demounting direction of a process cartridge.
Figure 25:
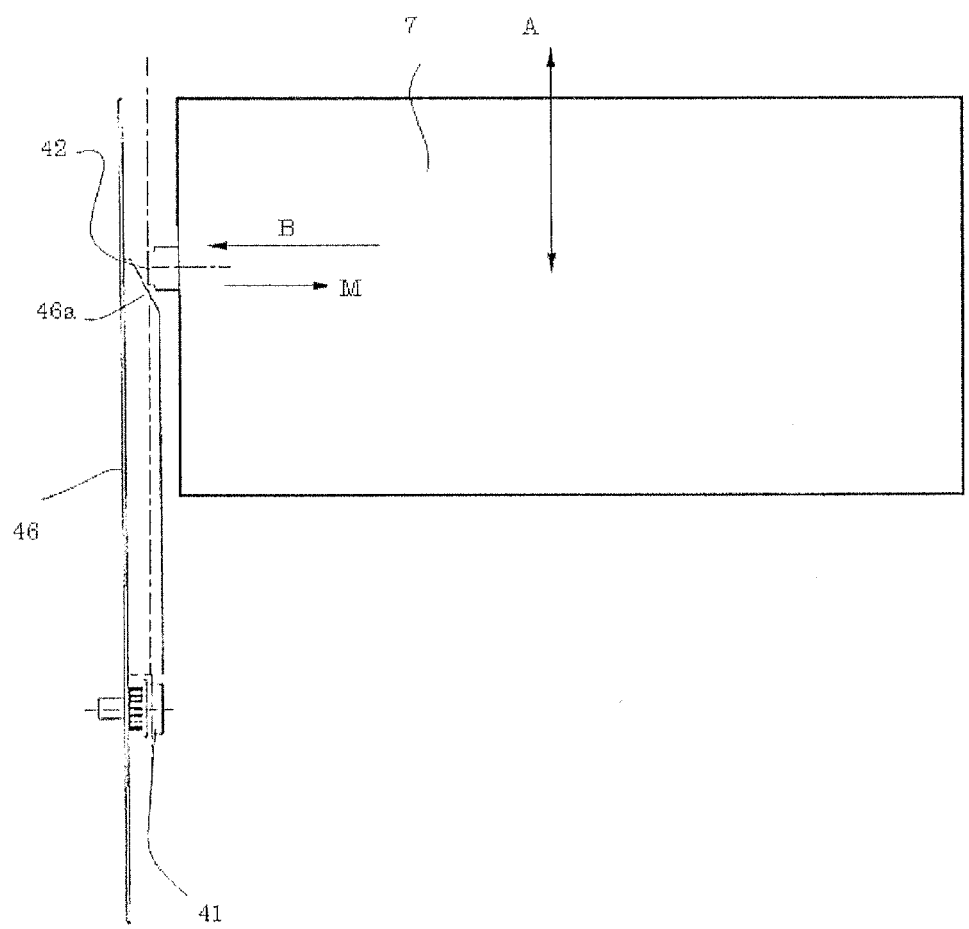
FIG. 25 is a plan view showing the mounting and demounting direction of the process cartridge.
Figure 26:
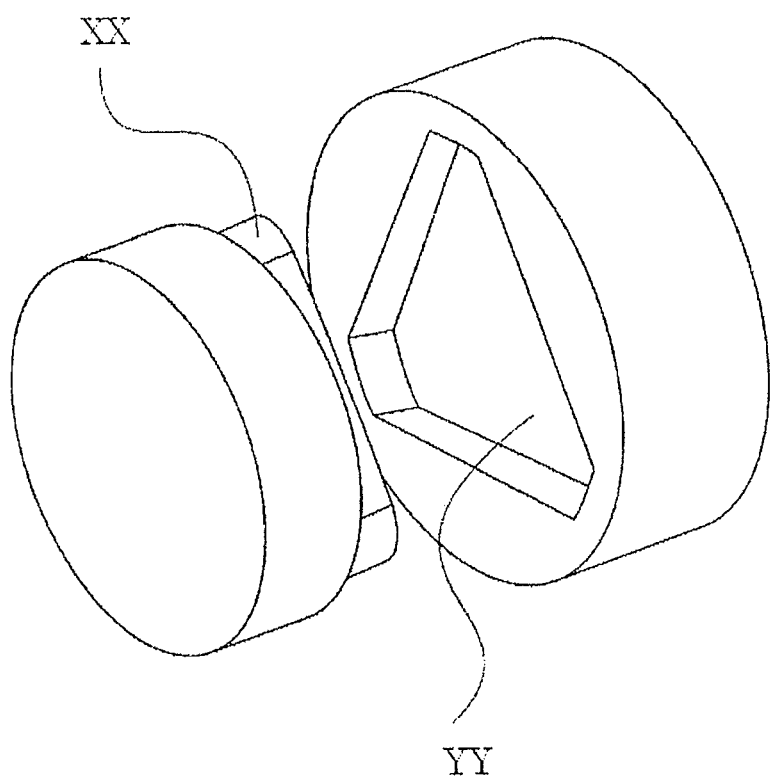
FIG. 26 is a perspective view showing a major part of a drive transmission device in the background art.

In the above-described embodiments, the examples in which the couplings are used as the drive transmission device between the intermediary transfer unit 12 as the unit and the apparatus main assembly are described but the present invention is also applicable to other units and couplings. For example, the present invention is applicable to couplings between the developing unit (cartridge) and the apparatus main assembly and couplings between the process cartridge 7 in Embodiment 1 and the apparatus main assembly. As shown in FIGS. 24 and 25, a constitution in which the process cartridge 7 has the driven cartridge 42 may also be employed. Further, the shape represented by the reference numeral 41 is shown for the driving cartridge and the shape represented by the reference numeral 42 is shown for the driven cartridge but the present invention can be carried out even when a relationship between these shapes is reversed. Further, the functions of the driving cartridge 41 and the driven cartridge 42 with respect to the engagement are similarly performed even in a constitution in which either coupling is retracted, e.g., when the unit is mounted into the apparatus main assembly.

INDUSTRIAL APPLICABILITY

According to the present invention, engagement and disengagement of drive transmission couplings from the apparatus main assembly to the detachably mountable unit are performed automatically with mounting and demounting of the unit.

While the invention has been described with reference to the structures disclosed herein, it is not confined to the details set forth and this application is intended to cover such modifications or changes as may come within the purpose of the improvements or the scope of the following claims.

The invention claimed is:

1. An image forming apparatus comprising:
a main assembly;
a rotatable first coupling provided in said main assembly, said first coupling being rotatable by a driving source; and
a transfer unit detachably mountable to said main assembly, said transfer unit being movable in a first direction when said transfer unit is dismounted from said main assembly, said transfer unit including a movable belt and a rotatable second coupling capable of receiving a driving force from said first coupling,
wherein the first direction is parallel with a traveling direction of said belt,
wherein one of said first coupling and said second coupling is movable in a second direction which is perpendicular to the first direction, and
wherein when said transfer unit is dismounted from said main assembly, one of said first coupling and said second coupling is moved in the second direction to retract from the other of said first and second couplings by said transfer unit being moved in the first direction with said first coupling and said second coupling kept in contact with each other.

2. The apparatus according to claim 1, wherein the second direction is a direction of a normal line of said second coupling, and the coupling movable in the second direction is said second coupling.

3. The apparatus according to claim 2, wherein one of said first coupling and said second coupling is provided with an inclined portion, and the other of said first and second couplings is provided with a contact portion contacting the inclined portion, and wherein when said transfer unit is dismounted from said main assembly, the inclined portion and the contact portion are in contact with each other.

4. The apparatus according to claim 3, wherein said first coupling has a recess, said second coupling has a projection, and said first coupling is provided with the inclined portion at an inner periphery of the recess.

5. The apparatus according to claim 4, wherein when said transfer unit is dismounted from said main assembly, said second coupling moves in the second direction along the inclined portion of said first coupling.

6. The apparatus according to claim 5, wherein said second coupling is provided with the contact portion which is a projection extending substantially parallel with the inclined portion.

7. The apparatus according to claim 6, wherein said first coupling is provided with a first engaging portion, said second coupling is provided with a second engaging portion engageable with said first engaging portion, and the driving force is transmitted from said first coupling to said second coupling by engagement between said first engaging portion and said second engaging portion.

8. The apparatus according to claim 7, further comprising a guiding portion for contacting said second coupling to retract said second coupling in the second direction when said transfer unit is dismounted from said main assembly.

9. The apparatus according to claim 1, wherein when said transfer unit is dismounted from said main assembly, said second coupling is moved in the first direction by said transfer unit moving in the first direction to rotate said second coupling relative to said first coupling about a contact position between said second coupling and said first coupling, the contact position being not on a rotational axis of said first coupling.

10. The apparatus according to claim 9, wherein said first coupling is provided with a first engaging portion, said second coupling is provided with a second engaging portion engageable with said first engaging portion, and the driving force is transmitted from said first coupling to said second coupling by engagement between said first engaging portion and said second engaging portion,
wherein when said second coupling rotates about the contact position, a maximum distance of movement of said second coupling in the first direction is $\alpha$, a distance through which a rotational axis of said second coupling moves in the second direction until said first engaging portion becomes disengageable from said second engaging portion by the retraction of the first coupling along the inclined surface of said second coupling is $\beta$, and $\alpha$ is greater than $\beta$.

11. The apparatus according to claim 1, wherein said transfer unit is provided with a transfer member which can be contacted to and spaced from said belt, and said transfer member is moved relative to said belt by said second coupling rotating by the driving force transmitted from the driving source through said first coupling.

* * * * *